(12) United States Patent
Cheng et al.

(10) Patent No.: US 12,229,258 B2
(45) Date of Patent: Feb. 18, 2025

(54) SYSTEM, METHOD, AND APPARATUS FOR SMART WHITELISTING/BLACKLISTING

(71) Applicant: PC Matic, Inc., Sioux City, IA (US)

(72) Inventors: Robert J. Cheng, Myrtle Beach, SC (US); Robert J. Woodworth, Jr., Charleston, SC (US); Andrew Tuch, Boca Raton, FL (US); Matthew Quincy Riley, Owosso, MI (US); Devin R. Bergin, Myrtle Beach, SC (US)

(73) Assignee: PC MATIC, INC., Sioux City, IA (US)

( * ) Notice: Subject to any disclaimer, the term of this patent is extended or adjusted under 35 U.S.C. 154(b) by 295 days.

(21) Appl. No.: 17/970,580

(22) Filed: Oct. 21, 2022

(65) Prior Publication Data

US 2023/0038774 A1 Feb. 9, 2023

Related U.S. Application Data

(63) Continuation-in-part of application No. 17/689,367, filed on Mar. 8, 2022, now Pat. No. 12,013,932, which is a continuation-in-part of application No. 17/246,869, filed on May 3, 2021, now Pat. No. 11,636,219, which is a continuation-in-part of application No. 17/134,716, filed on Dec. 28, 2020, now Pat. No. 11,507,675, which is a
(Continued)

(51) Int. Cl.
*G06F 21/00* (2013.01)
*G06F 21/51* (2013.01)
*G06F 21/56* (2013.01)

(52) U.S. Cl.
CPC .............. *G06F 21/56* (2013.01); *G06F 21/51* (2013.01); *G06F 2221/033* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 9,117,075 B1 * | 8/2015 | Yeh | G06F 21/567 |
| 10,853,058 B1 * | 12/2020 | Ouzan | G06F 8/71 |
| 11,416,561 B1 * | 8/2022 | Satish | H04L 63/105 |

(Continued)

OTHER PUBLICATIONS

Turaev, Hasan et al. Prevention of Ransomware Execution in Enterprise Environment on Windows OS: Assessment of Application Whitelisting Solutions. 2018 1st International Conference on Data Intelligence and Security (ICDIS). https://ieeexplore.ieee.org/stamp/stamp.jsp?tp=&arnumber=8367748 (Year: 2018).*

(Continued)

*Primary Examiner* — Jeremiah L Avery
(74) *Attorney, Agent, or Firm* — D2 Worldwide LLC; Frank Liebenow

(57) ABSTRACT

A system for intelligent managing whitelists and blacklist provides options and/or suggestions to the administrators and/or information technology team to allow administration of whitelists and/or blacklists based upon history and rules. For example, if permission to run a certain program is requested by several people in a group or organization and the program is not believed to have a virus, then, the administrator if presented with an option to enable (e.g., add to the whitelist) that program for the entire group or organization.

20 Claims, 30 Drawing Sheets

Related U.S. Application Data continuation-in-part of application No. 17/018,427, filed on Sep. 11, 2020, now Pat. No. 11,275,828.

(56) References Cited

U.S. PATENT DOCUMENTS

| | | | | |
|---|---|---|---|---|
| 2003/0172167 | A1* | 9/2003 | Judge | H04L 63/0236 709/229 |
| 2011/0047597 | A1* | 2/2011 | Mahaffey | H04L 67/60 709/219 |
| 2011/0145920 | A1* | 6/2011 | Mahaffey | H04W 12/12 726/22 |
| 2012/0030731 | A1* | 2/2012 | Bhargava | H04L 63/10 726/3 |
| 2013/0097659 | A1* | 4/2013 | Das | G06F 21/51 726/1 |
| 2014/0032691 | A1* | 1/2014 | Barton | H04W 12/08 709/206 |
| 2014/0040979 | A1* | 2/2014 | Barton | H04W 12/30 726/1 |
| 2014/0165130 | A1* | 6/2014 | Zaitsev | G06F 21/00 726/1 |
| 2014/0245376 | A1* | 8/2014 | Hibbert | G06F 21/577 726/1 |
| 2015/0339475 | A1* | 11/2015 | Feroz | G06F 21/566 726/23 |
| 2016/0321452 | A1* | 11/2016 | Richardson | H04W 12/12 |
| 2016/0359913 | A1* | 12/2016 | Gupta | H04L 43/106 |
| 2016/0373486 | A1* | 12/2016 | Kraemer | H04L 63/1433 |
| 2018/0307840 | A1* | 10/2018 | David | H04L 63/101 |
| 2019/0089678 | A1* | 3/2019 | Lam | H04L 63/0263 |
| 2019/0108342 | A1* | 4/2019 | Conikee | G06F 21/554 |
| 2019/0325135 | A1* | 10/2019 | David | H04L 63/101 |
| 2020/0167473 | A1* | 5/2020 | Polyakov | G06F 21/16 |
| 2020/0285752 | A1* | 9/2020 | Wyatt | G06F 21/566 |
| 2020/0285761 | A1* | 9/2020 | Buck | G06F 21/604 |
| 2020/0302058 | A1* | 9/2020 | Kenyon | G06F 21/554 |
| 2020/0382470 | A1* | 12/2020 | Butler | G06F 21/554 |
| 2020/0394295 | A1* | 12/2020 | Ikram | G06F 21/566 |
| 2023/0038774 | A1* | 2/2023 | Cheng | G06F 21/56 |

OTHER PUBLICATIONS

Powers, Josh et al. Whitelist malware defense for embedded control system devices. 2015 Saudi Arabia Smart Grid (SASG). https://ieeexplore.ieee.org/stamp/stamp.jsp?tp=&arnumber=7449271 (Year: 2015).*

He, Daojing et al. Mobile application security: malware threats and defenses. IEEE Wireless Communications, vol. 22, Issue: 1. https://ieeexplore.ieee.org/stamp/stamp.jsp?tp=&arnumber=7054729 (Year: 2015).*

Wibowo, Fahrudin Mukti et al. Collaborative Whitelist Packet Filtering Driven by Smart Contract Forum. 2019 International Seminar on Research of Information Technology and Intelligent Systems (ISRITI). https://ieeexplore.ieee.org/stamp/stamp.jsp?tp=&arnumber=9034654 (Year: 2019).

Rezvani, Mohsen et al. Anomaly-free policy composition in software-defined networks. 2016 IFIP Networking Conference (IFIP Networking) and Workshops. https://ieeexplore.ieee.org/stamp/stamp.jsp?tp=&arnumber=7 497226 (Year: 2016).

Turaev, Hasan et al. Prevention of Ransomware Execution in Enterprise Environment on Windows OS: Assessment of Application Whitelisting Solutions. 2018 1st International Conference on Data Intelligence and Security (ICDIS). https://ieeexplore.ieee.org/starnp/stamp.jsp?tp=&arnumber=83677 48 (Year: 2018).

Powers, Josh et al. Whitelist malware defense for embedded control system devices. 2015 Saudi Arabia Smart Grid (SASG). https://ieeexplore.ieee.org/starnp/starp.jsp?tp=&arnurnber=7 449271 (Year: 2015).

* cited by examiner

SYSTEM, METHOD, AND APPARATUS FOR SMART WHITELISTING/BLACKLISTING

CROSS-REFERENCE TO RELATED APPLICATION

This application is a continuation-in-part of U.S. patent application Ser. No. 17/689,367 filed Mar. 8, 2022; which is a continuation-in-part of U.S. patent application Ser. No. 17/246,869 filed May 3, 2021; which is a continuation-in-part of U.S. patent application Ser. No. 17/134,716, filed Dec. 28, 2020; which is a continuation-in-part of U.S. patent application Ser. No. 17/018,427, filed Sep. 11, 2020 now U.S. Pat. No. 11,275,828, issued Feb. 23, 2022; the disclosure of which are hereby incorporated by reference.

FIELD

This invention relates to computer security and more particularly to a system for providing enhanced, smart whitelist/blacklist operations.

BACKGROUND

Currently, many software systems attempt to provide a secure computing environment. Such systems are typically referred to as firewalls, anti-malware software, etc. Any computer (including cellular phones, etc.) that is connected to a network is subject to intrusion from that network.

Today, many intrusions start with reception of malicious software, typically a script or executable. Malicious software is typically a software program that gets installed on the user's computer or device, sometime without permission or knowledge of the user. In some instances, the malicious software is delivered to the user in an email, typically an attached file, or from a web site. Upon opening of the file or clicking a link, the malicious software is copied onto the user's computer storage and begins to run.

To prevent such malicious software from infecting a computing environment, some anti-malware software operates on a principle of whitelists. With such, any program that is not on a whitelist (e.g., a list of approved programs) is blocked. Therefore, if a malicious software is introduced to a user's computer, it will likely not be on the whitelist and, therefore, be blocked from executing. A whitelist requires users and/or administrators to constantly update their whitelists to include new programs that are needed/desired for users to perform their tasks. This is a small price to pay for the added security.

Whitelisting provides good security but requires additional administration to add programs/scripts that are needed by various users. While whitelisting is good at blocking undesirable programs and scripts, whitelisting does result in more blocking of programs/scripts that are not malicious, called false positives. Therefore, programs/scripts that the user knows or believes to be trustworthy are blocked from execution until an administrator adds the program/script to the whitelist, which in some corporate environments, requires requesting such from an information technology (IT) team.

Another way to prevent such malicious software from infecting a computing environment, some anti-malware software works on a principle of blacklists. With such, any program/script that is listed on a blacklist (e.g., a list of known malicious programs/scripts) is blocked. Therefore, when a new malicious software is created, it will likely not be on the blacklist until it is discovered, analyzed, added to a blacklist, and distributed to each computer that may experience the program or script. Once discovered, the malicious software is added to the blacklist and the blacklist is distributed Therefore, the malicious software will be blocked from executing. A blacklist requires users and/or administrators to constantly update their blacklists to include new programs/scripts that are undesirable. The blacklist provides for a small window between when new malicious software is first deployed and when this malicious software is discovered, added to a master blacklist, and distributed to multiple computers/devices.

Blacklisting sometimes result in blocking of programs that are not malicious, called false positives. For example, if it found that a virus is masquerading as "word.exe," and the program name, "word.exe" is blacklisted, then legitimate versions of this program will be disallowed. Removal of a blacklisted item from the blacklist often requires an administrator and, in some corporate environments, requires requesting such from an information technology (IT) team.

Today, the tools provided for the IT team or administrators are limited to adding or removing a program to/from a whitelist or blacklist globally, for an organization or group, or for a single computer/device. When the IT team deals with many computers/devices, there are often several IT personnel managing requests and making changes throughout the day/week, not knowing what other IT personnel are doing and making decisions on a case-by-case basis. As such, there is little intelligence provided regarding how to best serve an organization. For example, if in response to a request in a corporate environment, an IT person adds a new program to a single user's whitelist, that IT person may not have information that several other IT personnel have added the same program to other individual whitelists within the same organization and if that IT person had known such information, a decision was then possible to add the program to an organization-wide whitelist.

In another example, currently, when a request to use a new program is made by a user in a corporate environment, an IT person adds the new program to an organization-wide whitelist. Without understanding the organization structure or without having hierarchical whitelists/blacklists, the IT person lacks information and tools to allow use of the new program within a limited group-wide whitelist such as a team-wide whitelist, department-wide whitelist, or the company-wide whitelist. By limiting enablement of the new program to the smallest group possible (e.g., a group that is smaller than the entire company), the overall risk is reduced to only those devices within the smaller group. If the program turns out to be malicious, only that group is affected and not the entire company.

What is needed is a tool to aid the administrator in managing whitelists and blacklist.

SUMMARY

A system for intelligent managing of whitelists and blacklist provides options and/or suggestions to the administrators and/or information technology team to allow administration of whitelists and/or blacklists based upon history and rules. For example, if permission to run a certain program is requested by several people in a group or organization and the program is not believed to have a virus, then, the administrator is presented with an option to enable (e.g., add to the whitelist) that program for the entire group or organization. When the rules are created or customized, the rules are tailored to the organization. For example, in a high-risk group such as a development group, when a request within that organization is made, the enablement is often limited to only that smaller group, but when a request is made in a safer group such as marketing, the enablement is often made to a larger group as the sales group often needs the same program.

In one embodiment, the system for smart whitelisting/blacklisting is disclosed. The system includes a server computer having an administrative program running thereon and a mechanism for requesting a target activity be enabled on a device. When a request for the target activity is received, information regarding the request is added to a history file by the administrative program and the administrative program runs a set of rules for the request using the history file to make a recommendation. When the recommendation indicates that the target activity be enabled on a single device, a whitelist and/or a blacklist is modified to enable the target activity at the device and the whitelist and/or the blacklist is distributed by the administrative program to the device. When a positive response is received by the administrative program responsive to the recommendation, the whitelist and/or the blacklist is modified to enable the target activity and the whitelist and/or the blacklist is distributed by the administrative program to a plurality of devices based upon the recommendation. When a negative response is received by the administrative program responsive to the recommendation, the whitelist and/or the blacklist is modified to enable the target activity and the whitelist and/or the blacklist is distributed by the administrative program to the device.

In another embodiment, a method for computer security is disclosed including requesting, by a user of a device, that a target activity be enabled on the device. Responsive to the requesting by the user, adding information regarding the target activity to a history file and making a recommendation using a set of rules and the history file. When the recommendation indicates that the target activity be enabled on a single device, modifying a whitelist and/or a blacklist to enable the target activity at the device and distributing the whitelist and/or the blacklist to the device. When receiving a positive response to the recommendation, modifying the whitelist and/or the blacklist to enable the target activity and distributing the whitelist and/or the blacklist to a plurality of devices based upon the recommendation. When receiving a negative response to the recommendation, modifying the whitelist and/or the blacklist to enable the target activity and the whitelist and/or the blacklist is distributed to device.

In another embodiment, a method for protecting a device is disclosed including after a program attempts to run on the device, protection software running on the device determines whether the program is allowed to run based upon a blacklist and a whitelist. The program is allowed to run based upon the program being absent from the blacklist or the program is allowed to run based upon the program being absent from the blacklist or present on the whitelist, thereby allowing the program to run on the device. Otherwise, when the program is present on the blacklist and absent from the whitelist, the protection software prevents the program from running on the device and the protection software sends a transaction with details of the program to administrative software running on a server. Responsive to receiving the transaction at the server, the administrative software running on the server saves the details of the program in a history file and the administrative software running on the server analyzes the history file with respect to a set of rules to determine a recommendation for enabling the program. When the recommendation indicates to enable the program on a single device, the administrative software running on the server modifies the whitelist and/or the blacklist to enable the program at the device and the administrative software running on the server distributes the whitelist and/or the blacklist to the device. Otherwise, when the recommendation indicates to enable the program on a plurality of devices within an organization, the administrative software running on the server modifies the whitelist and/or the blacklist to enable the program and the administrative software running on the server distributes the whitelist and/or the blacklist to the plurality of devices.

BRIEF DESCRIPTION OF THE DRAWINGS

The invention can be best understood by those having ordinary skill in the art, by referencing the following detailed description when considering the accompanying drawings, in which.

DETAILED DESCRIPTION

Figure 1:
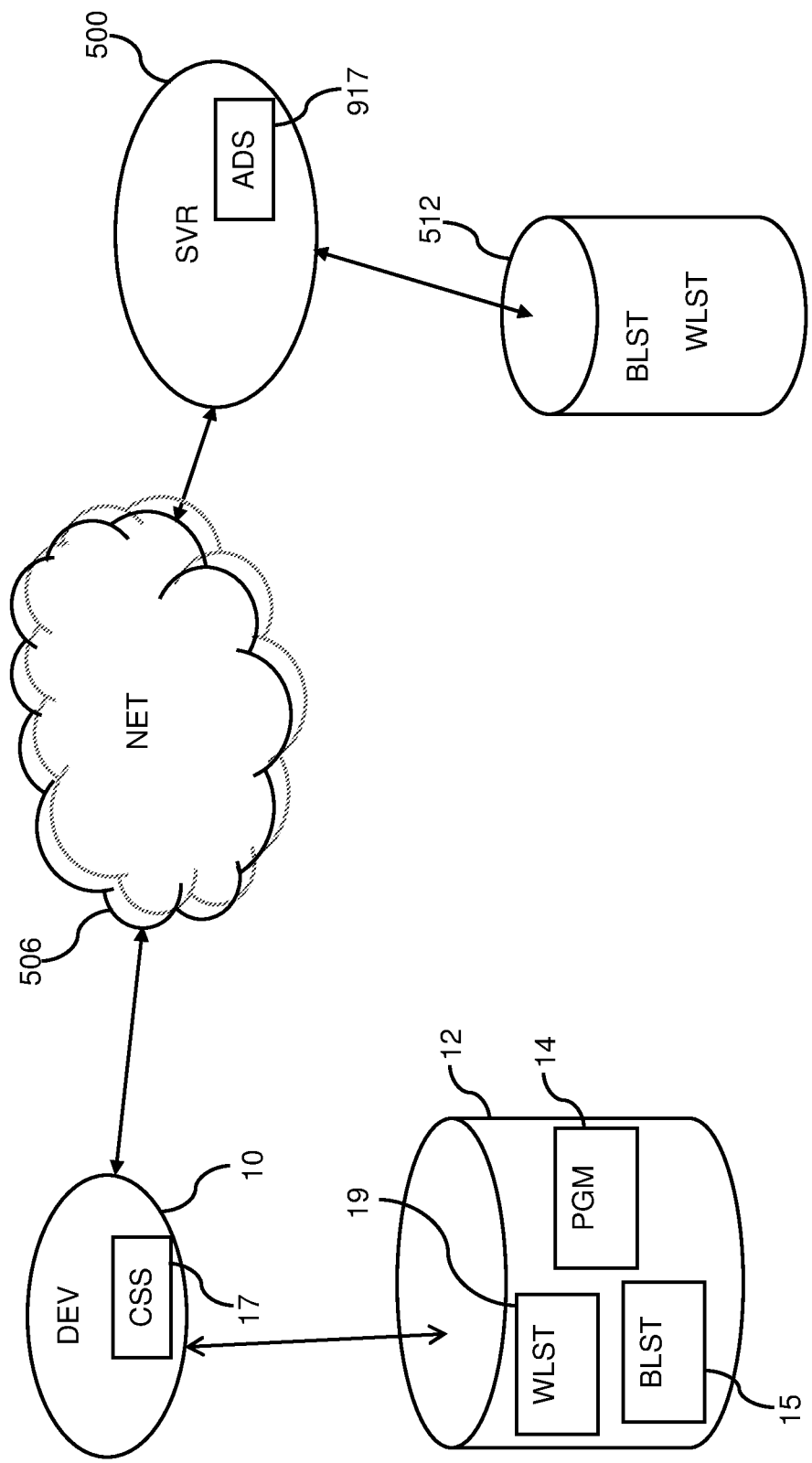
FIG. 1 illustrates a data connection diagram of the computer security system.

Reference will now be made in detail to the presently preferred embodiments of the invention, examples of which are illustrated in the accompanying drawings. Throughout the following detailed description, the same reference numerals refer to the same elements in all figures.

In general, a whitelist/blacklist-based computer security system provides an automated way to prevent execution of software containing code that is potentially contaminated (e.g., contains or is malicious software). Before execution of any code on the target computer system, a test is performed by checking one or more whitelists and/or blacklists to determine if the code has been enabled for execution (whitelist) or prevented from execution (blacklist) on the target computer system and, if the code is on the blacklist, execution of the code is blocked unless an entry in a whitelist permits execution of the code. It is fully anticipated that there be multiple blacklists and whitelists, for example, a global blacklist, a global whitelist, a company whitelist and/or blacklist, a department-wide whitelist and/or blacklist, a local blacklist, and a local whitelist. Further, any form and location of storage of the blacklist(s) and whitelist(s) are anticipated, including local memory.

Throughout this description, the term, "computer" refers to any system that has a processor and runs software. Examples of such are: a personal computer, a server, a notebook computer, a tablet computer, a smartphone, a smart watch, a smart television, etc. The term, "user" refers to a human that has an interest in the computer, perhaps a person (user) who is using the computer.

Throughout this description, the term "directory" or "directory path" describes a hierarchical pathway to a particular folder in which files (e.g., data or programs) are stored. For example, "C:/windows/system32" refers to files stored in a folder called "system32" which is a subfolder of another folder called "windows" which is a top-level folder of a storage device known as "C." Note that the storage device (e.g., C:) is at times a physical device (e.g., a separate disk drive) or a logical device (e.g., a portion of a disk drive). Also note that the described representation (e.g., "C:/windows/system32") is a human-readable representation of such hierarchy used by certain operating systems and any such representation is anticipated and included herein (e.g., some representations use backslashes instead of slashes).

Throughout this description, the term, "malicious software" or "malware" refers to any software having ill-intent. Many forms of malicious software are known; some that destroy data on the host computer; some that capture information such as account numbers, passwords, etc.; some that fish for information (phishing), pretending to be a known entity to fool the user into providing information such as bank account numbers; some encrypt data on the computer and hold the data at ransom, etc. A computer virus is a form of malicious software.

In general, the system, method, and apparatus being described utilizes efficient storage and retrieval mechanisms to determine if a program (e.g., an executable, macro, form, etc.) is identified within a list, either a whitelist or a blacklist. A hash table is one such mechanism, though other mechanisms are equally anticipated and included here within. As an efficient way of characterizing the questionable program, in some embodiments, it is anticipated that rather than storing the entire program in such tables, a portion of the program is stored, often referred to as a signature of the program. For example, the signature contains key sequences found within the program; finding of such key sequences typically indicates that the program matches the signature or a hash value of the program.

Referring to FIG. 1 illustrates a data connection diagram of the exemplary computer security system for managing whitelists and blacklist. In this example, a target computer 10 (e.g., a personal computer that is being protected) communicates through a network 506 (e.g., the Internet, local area network, etc.) to a server computer 500.

The server computer 500 has access to data storage 512. One item in the data storage 512 is a blacklist 15 and another is a whitelist 19; for example, a blacklist 15 of programs/applications that are known to be of high risk of malware and, therefore, not allowed to execute while a whitelist 19 is a list of programs/applications that are known to be of low-risk of malware and, therefore, generally allowed to execute. In some embodiments, the data storage 512 is in the cloud. Although one path between the target computer 10 and the server computer 500 is shown going through the network 506 as shown, any known data path is anticipated. For example, the Wi-Fi transceiver 96 (see FIG. 2) of the target computer 10 is used to communicate with the wide area network 506, which includes the Internet, and, consequently, with the server computer 500.

The server computer 500 transacts with computer security system software that runs on the target computer 10 through the network(s) 506. The computer security system software 17 runs on the target computer 10 and monitors any activation of programs/applications/scripts (e.g., running of a program) and provides or denies permission for running the program/application/script on the target computer 10. The program/application/script is allowed to run when the programs/applications/scripts is deemed malware-free (e.g., is not in the blacklist 15 or is in the whitelist 19). Information is also transferred from computer security system software 17 that runs on the target computer 10 to the server computer 500 regarding potential threats, etc.

The server computer 500 transacts with the computer security system software 17 that runs on the target computer 10 as needed, for example, to update the whitelist 19 and/or blacklists 15 stored on the target computer 10.

The computer security system software 17 that runs on the target computer 10 selectively provides execution approval to software that attempts to execute on the target computer 10. In such, if approval is provided, the software is able to execute on the target computer 10. If approval is not provided, the software is blocked from executing on the target computer 10 and various additional steps are taken such as logging the attempt, transferring the suspect software to the server computer 500 for analysis, and informing the user of the target computer 10, etc.

Figure 2:
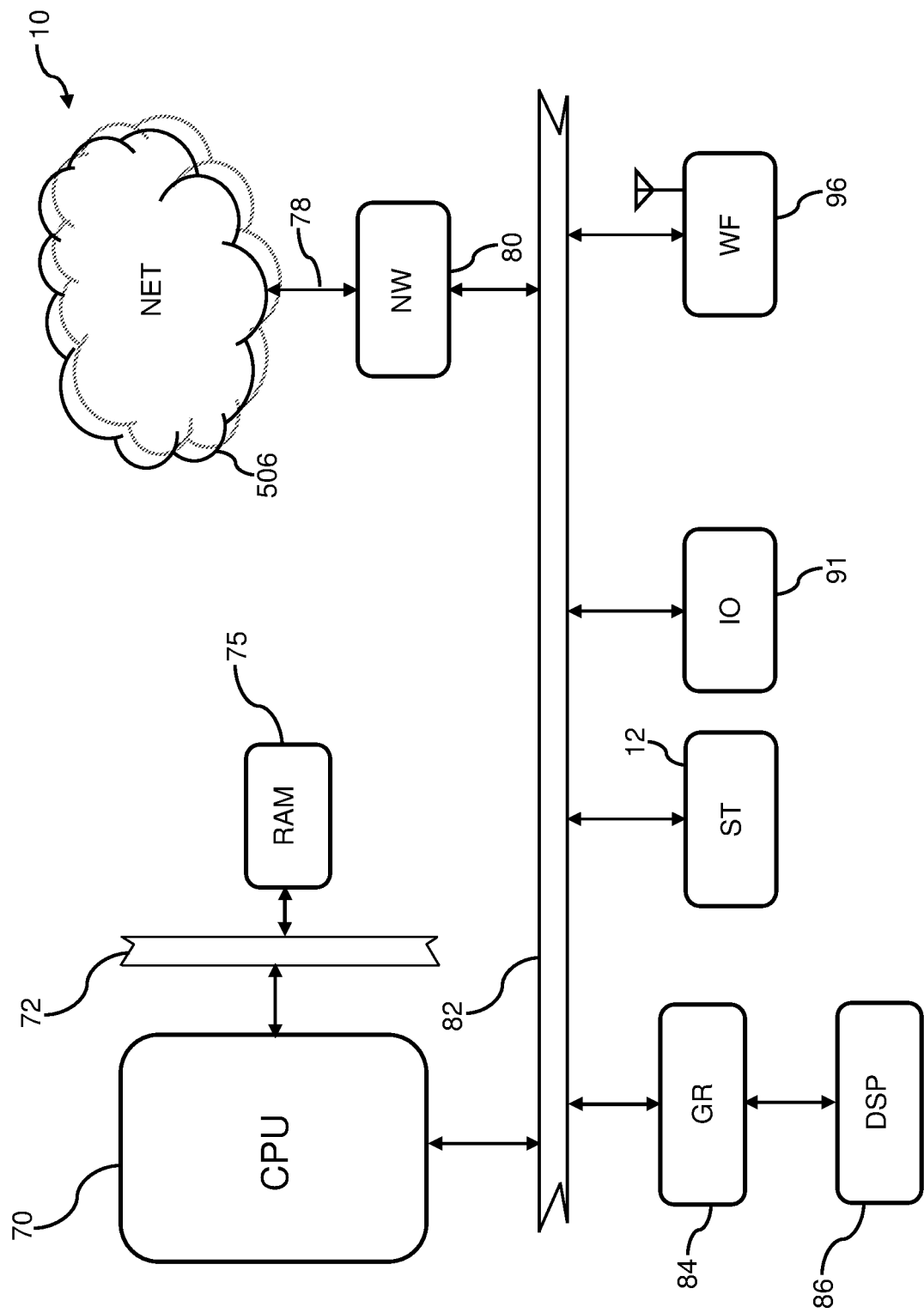
FIG. 2 illustrates a schematic view of a typical computer protected by the computer security system with smart whitelisting/blacklisting.

Referring to FIG. 2, a schematic view of a typical target computer 10 is shown. The computer security system software 17 running on the target computer 10 executes on any processor-based device (e.g., target computer 10) for providing protection against programs/applications/scripts that contain malicious software (malware). The present invention is in no way limited to any particular computer. Protection for many other processor-based devices are equally anticipated including, but not limited to smart phones, cellular phones, portable digital assistants, routers, thermostats, fitness devices, smart watches etc.

The example target computer 10 represents a typical device that is protected by computer security system software 17 that runs on the target computer 10. This exemplary target computer 10 is shown in its simplest form. Different architectures are known that accomplish similar results in a similar fashion, and the present invention is not limited in any way to any particular computer system architecture or implementation. In this exemplary target computer 10, a processor 70 executes or runs programs in a random-access memory 75. The programs are generally stored within a persistent memory, storage 12, and loaded into the random-access memory 75 when needed. The processor 70 is any processor, typically a processor designed for phones. The random-access memory 75 is interfaced to the processor by, for example, a memory bus 72. The random-access memory 75 is any memory suitable for connection and operation with the selected processor 70, such as SRAM, DRAM, SDRAM, RDRAM, DDR, DDR-2, etc. The storage 12 is any type, configuration, capacity of memory suitable for persistently storing data, for example, flash memory, read only memory, battery-backed memory, hard disk, etc. In some exemplary target computers 10, the storage 12 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and user I/O devices 91 such as mice, keyboards, touchscreens, etc. The graphics adapter 84 receives commands from the processor 70 and controls what is depicted on the display 86. The user I/O devices 91 provides navigation and selection features.

In general, some portion of the storage 12 is used to store programs, executable code, and data, etc. In some embodiments, other data is stored in the storage 12 such as audio files, video files, text messages, etc.

The peripherals shown are examples, and other devices are known in the industry such as Global Positioning Subsystems, speakers, microphones, USB interfaces, cameras, microphones, Bluetooth transceivers, Wi-Fi transceivers 96, image sensors, temperature sensors, etc., the details of which are not shown for brevity and clarity reasons.

In some embodiments, a network interface 80 connects the target computer 10 to the network 506 through any known or future protocol such as Ethernet, Wi-Fi, GSM, TDMA, LTE, etc., through a wired or wireless medium 78. There is no limitation on the type of connection used. In such, the network interface 80 provides data and messaging connections between the target computer 10 and the server computer 500 through the network 506.

Figure 3:
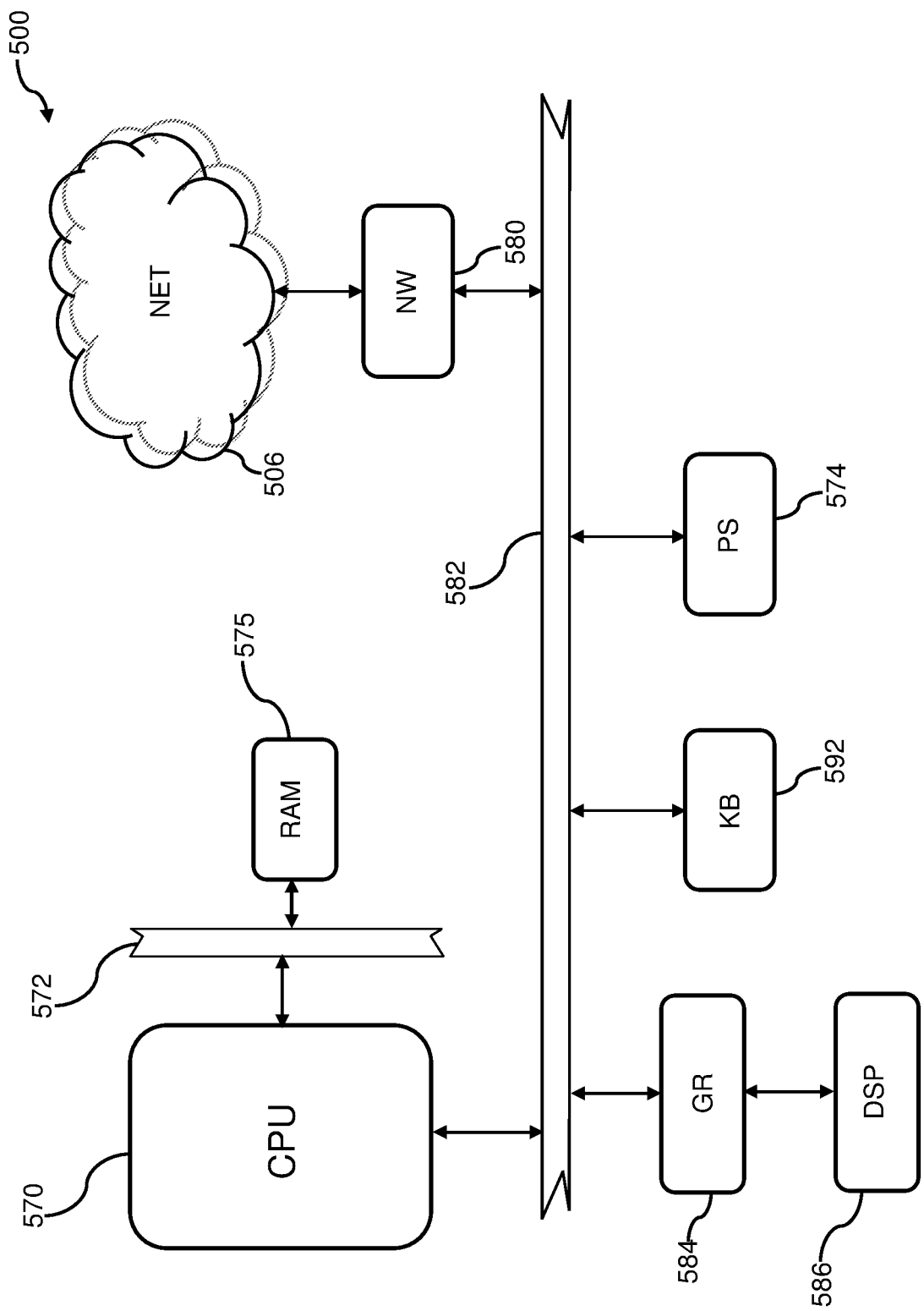
FIG. 3 illustrates a schematic view of a typical server computer system.

Referring to FIG. 3, a schematic view of a typical server computer system (e.g., server computer 500) is shown. The example server computer 500 represents a typical server computer system used for back-end processing, generating reports, displaying data, etc. This exemplary server computer 500 is shown in its simplest form. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Referring to FIGS. 4, 5, 6, and 6B, user interfaces 100, 100A, 100B of the computer security system for managing whitelists and blacklist are shown. Although many user interfaces are anticipated, one set of examples are shown for brevity reasons. The user interfaces 100/100A that are shown represent that a program 14 is stored on the target computer 10. There are many ways for this program 14 to be loaded and initiated on the target computer 10, for example, through an email system, through a browser, through a forms interface, etc. The computer security system software 17 intercepts and processes all requests to initiate operation of any type of program.

Figure 4:
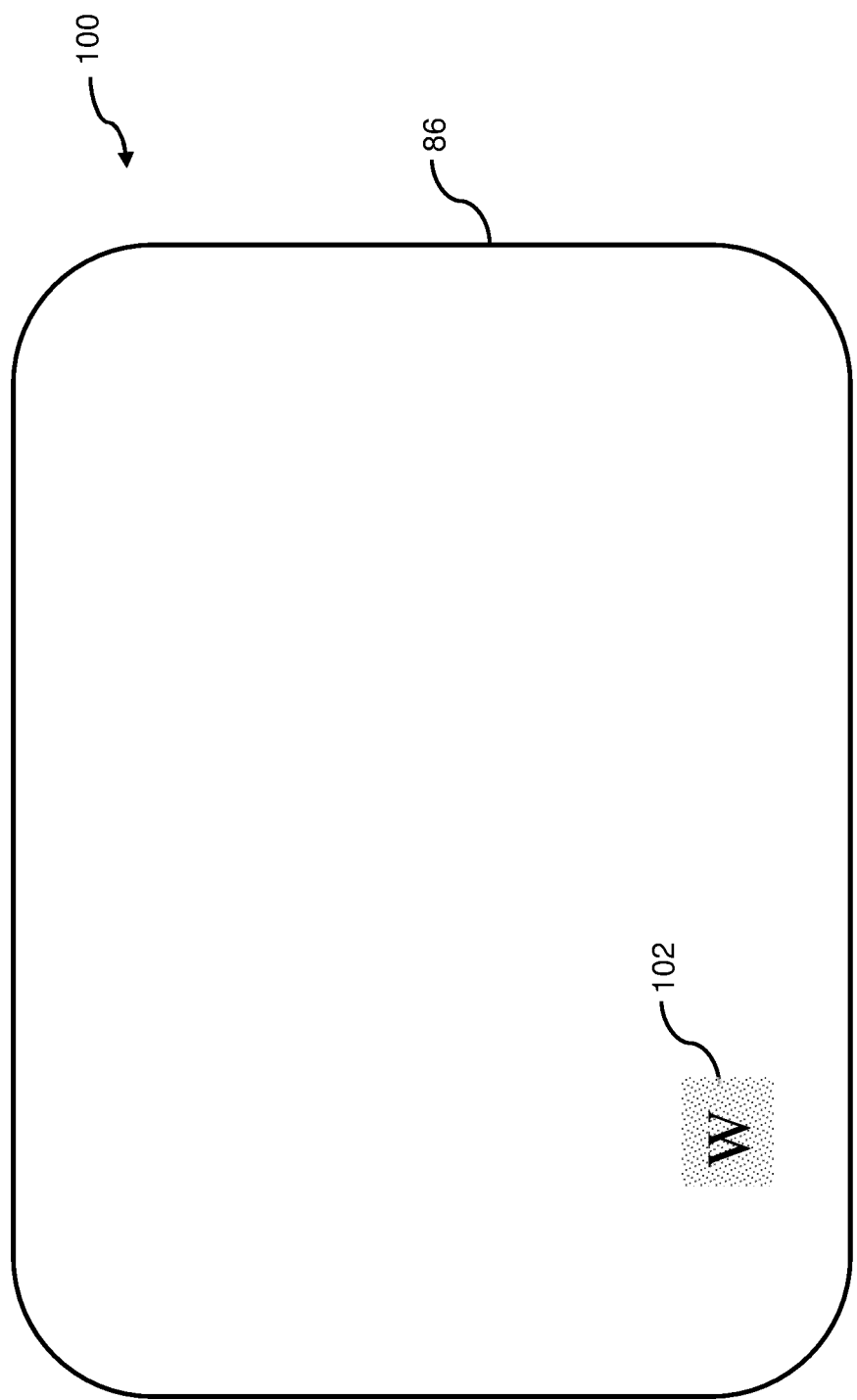
FIG. 4 illustrates a computer user interface of the computer security system.

One such program 14 is shown as an example in a user interface 100 of FIG. 4. A program 14 (e.g., a word processing program) is represented as an icon 102 on a display 86. As with many windowing programs, a user typically selects the icon 102, for example, double-clicking on the icon 102, and the operating system and/or user interface software initiates execution of the program 14 on the target computer 10. For example, in some operating systems, double clicking on a word processor icon initiates (runs) a word processing program that is associated with the word processor icon.

Figure 7:
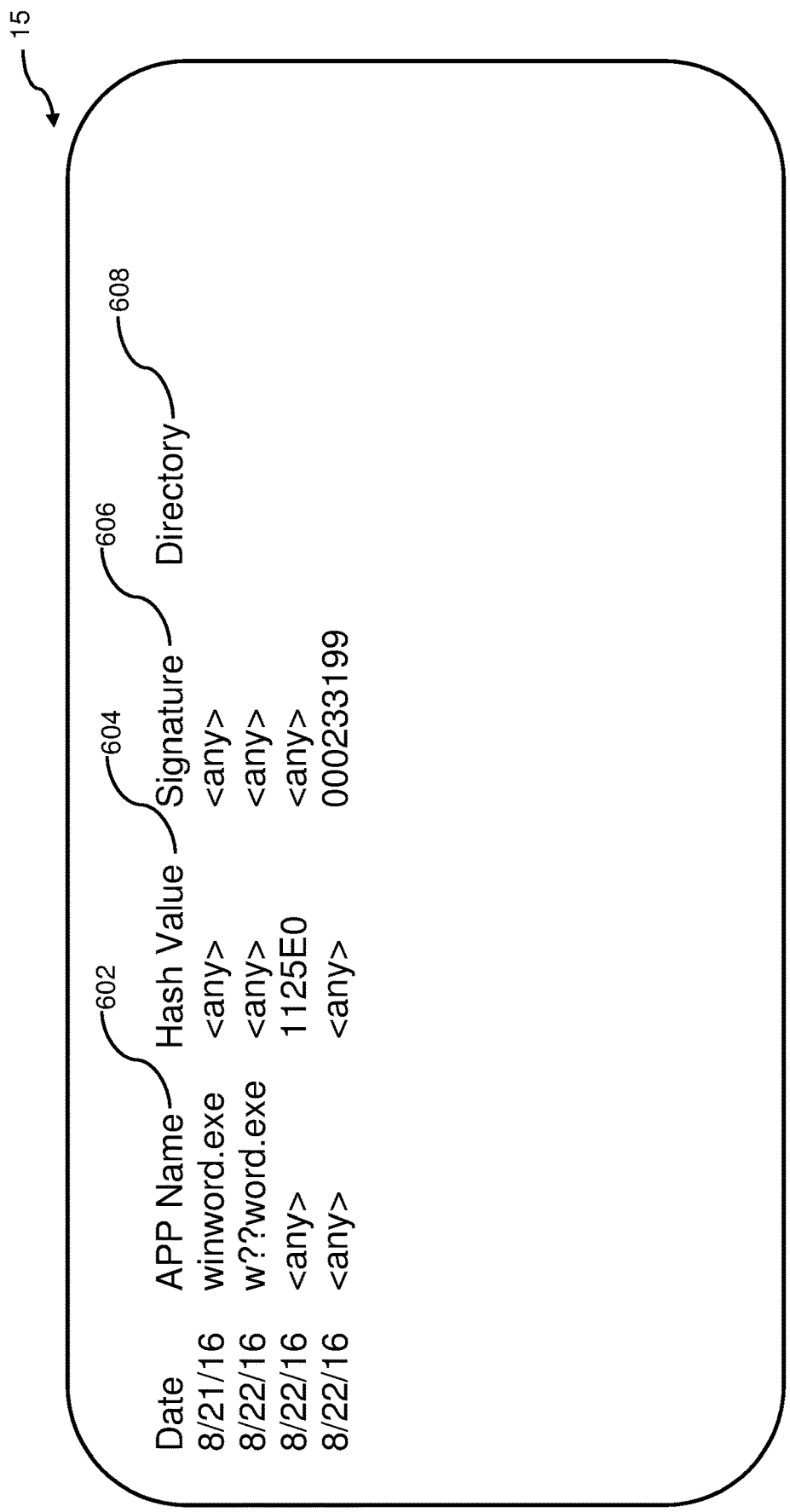
FIG. 7 illustrates an exemplary blacklist of the computer security system.

After the user selects the icon 102 (e.g., double clicking) and the operating system of the target computer 10 attempts to initiate/run the program 14 associated with the icon 102, the computer security system software 17 analyzes the program 14 associated with the icon 102 and determines if the program 14 is contained in the whitelist 19 and/or blacklist 15 (see FIG. 7). If the program 14 associated with the icon 102 is listed in the whitelist 19 or is not listed in the blacklist 15, the program 14 is deemed acceptable and is allowed to run. If the program 14 associated with the icon 102 is found in the blacklist 15, it is assumed to have the potential to be/contain malware unless the program 14 is found in the whitelist 19. Therefore, if the program 14 is found in the blacklist 15, the program 14 is prevented from running and an error message 105 is displayed. Notification of an attempt to run the program 14 is made to an administrator of the target computer 10, for example, a message is sent/displayed to the administrator or a record is added to a logfile either on the target computer 10, the server computer 500, or both. For the remainder of this description, the administrative software 917 will be described as running on the server computer 500, though it is equally anticipated that the administrative software 917 runs on the target computer 10 or any device or any combination thereof.

Based upon user security settings and global information, the administrative software 917 will make intelligent decisions as to whether the program 14 associated with the icon 102 is dangerous based upon any of several factors, and if it is determined that the program 14 associated with the icon 102 is not dangerous, the administrative software 917 will add an entry to the whitelist 19 to allow future execution of the program 14 associated with the icon 102. On the other hand, if it is determined that the program 14 associated with the icon 102 is dangerous, the administrative software 917 will add an entry to the blacklist 15 to prevent future execution of the program 14 associated with the icon 102.

Figure 6:
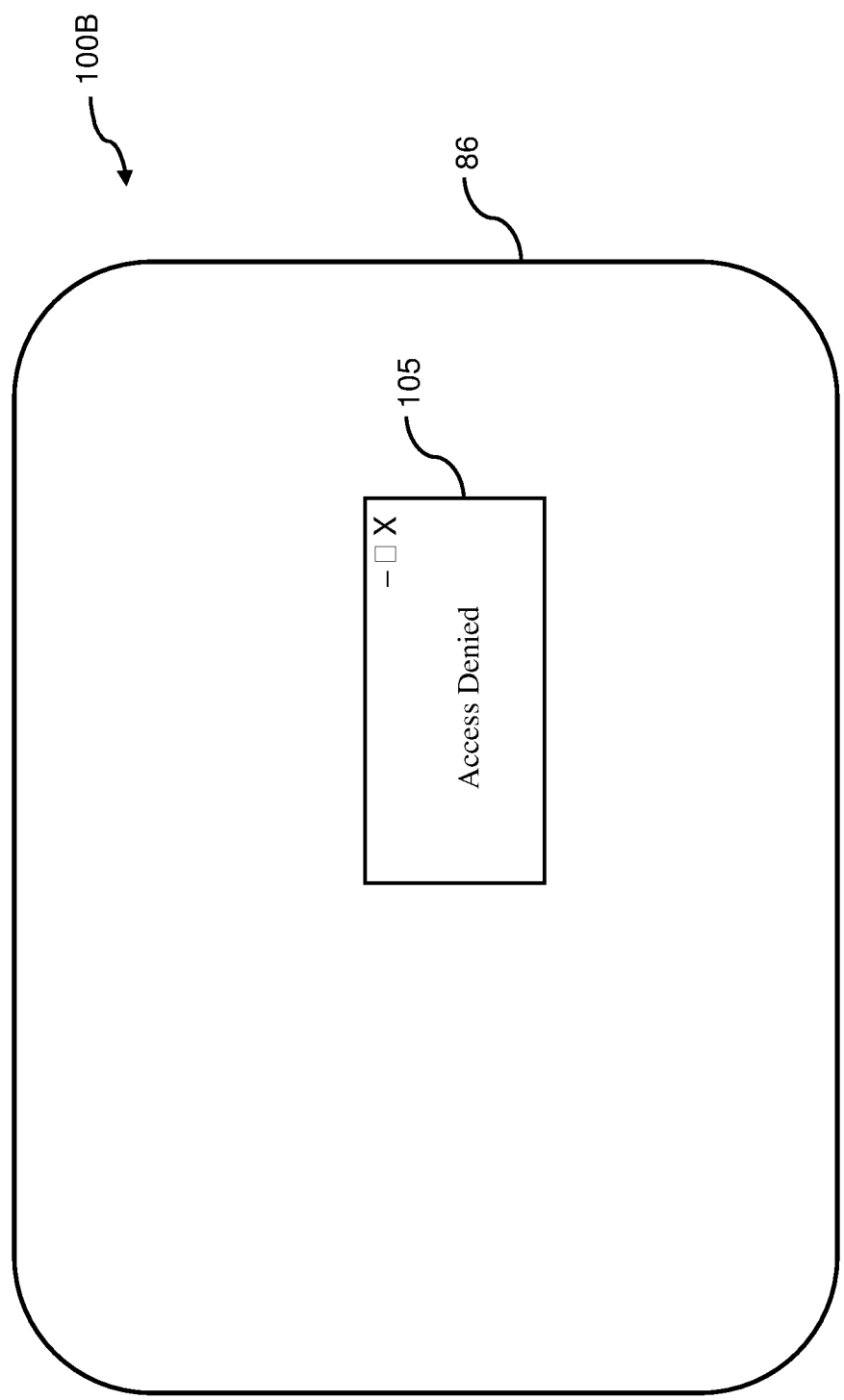
FIG. 6 illustrates a third computer user interface of the computer security system.
Figure 6A:
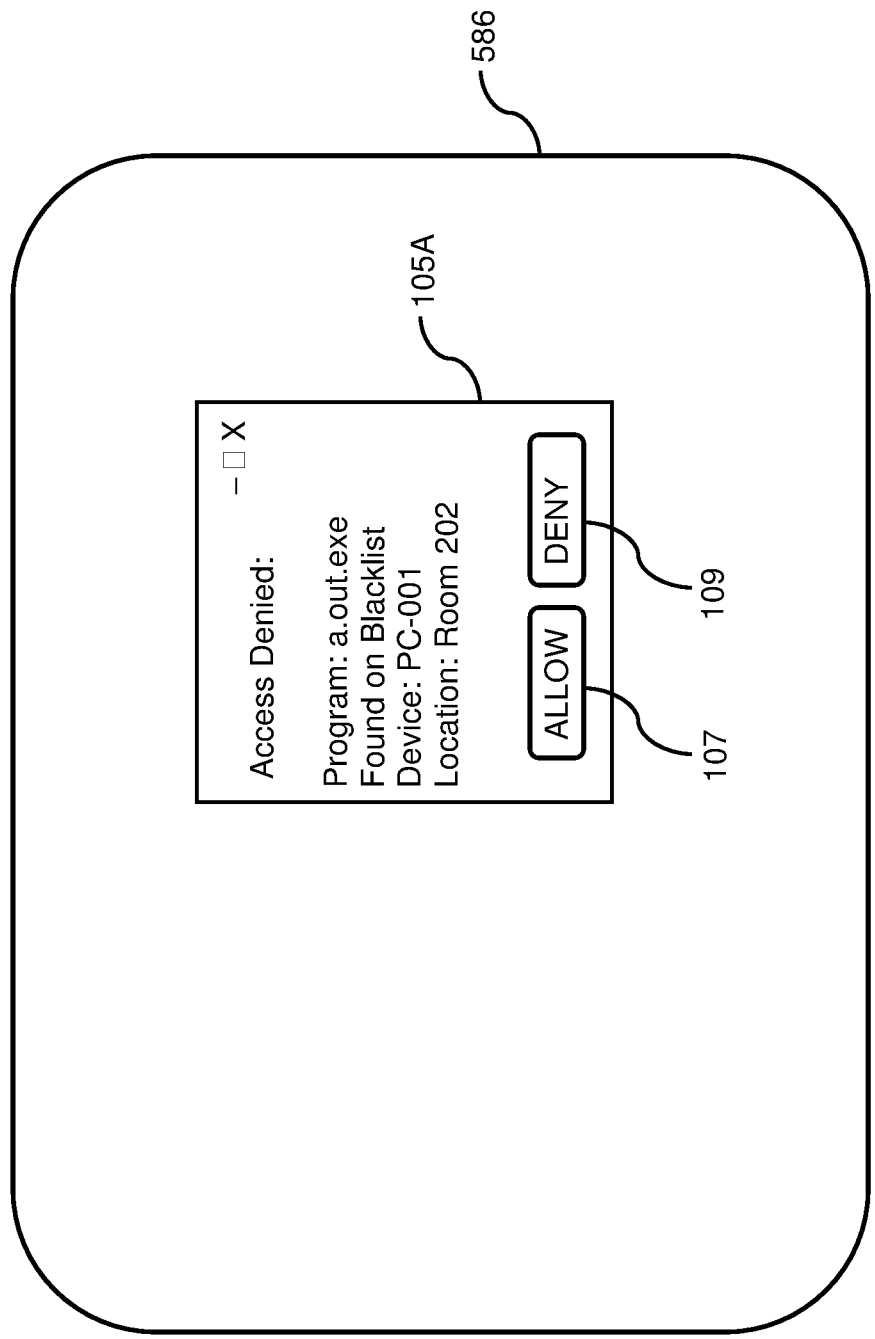
FIG. 6A illustrates a computer user interface of the prior art.

In the past, the administrator would review the log files or be presented with a user interface 105A as shown in FIG. 6A. The user interface 105A includes a message window that describes the program 14 that was attempted to be executed, the location where the program 14 was attempted to be executed, other information regarding the program 14 and selection icons 107/109. In the prior art, the administrator had the ability to either allow 107 or deny 109 future executions of the program 14 (e.g., either add the program 14 to the blacklist 15, add the program to the whitelist 19, or not add the program 14 to either the blacklist 15 or the whitelist 19).

Instead of a simple allow/deny, the administrator user interface 105A, enhanced tools are provided to the administrator to reduce frustrations of users of the target computers 10 by applying heuristics and historical data to the event (the attempted execution) and to present alternatives that will allow future executions of, not only the program 14, but of other programs that, by nature of the program 14, are likely to be benign. The program 14 and other programs form a program classification or a group of programs that have in common a folder in which they are stored, a certification, an origin company, etc. For example, when a software suite such as an office suite is installed into a folder, initially all programs in that folder are not in the blacklist 15 and execution of each is allowed. When such program attempts to run (e.g., a word processor), it is allowed unless an administrator removes the program from the whitelist 19 or adds the program to the blacklist 15. If the administrator removes the program from the blacklist 15, malware pretending to be that program are also allowed to execute. If the administrator recognizes that the program is part of an installed package, the administrator can add an entry to the whitelist 19, for example, the classification of all programs running from the same directory or the classification of all programs sharing the digital signature of the word processor. This would allow a program that matches an entry in the blacklist 15 to run if that program is being run out of the cited directory or if that program is in the same classification (e.g., same digital certificate).

Figure 6B:
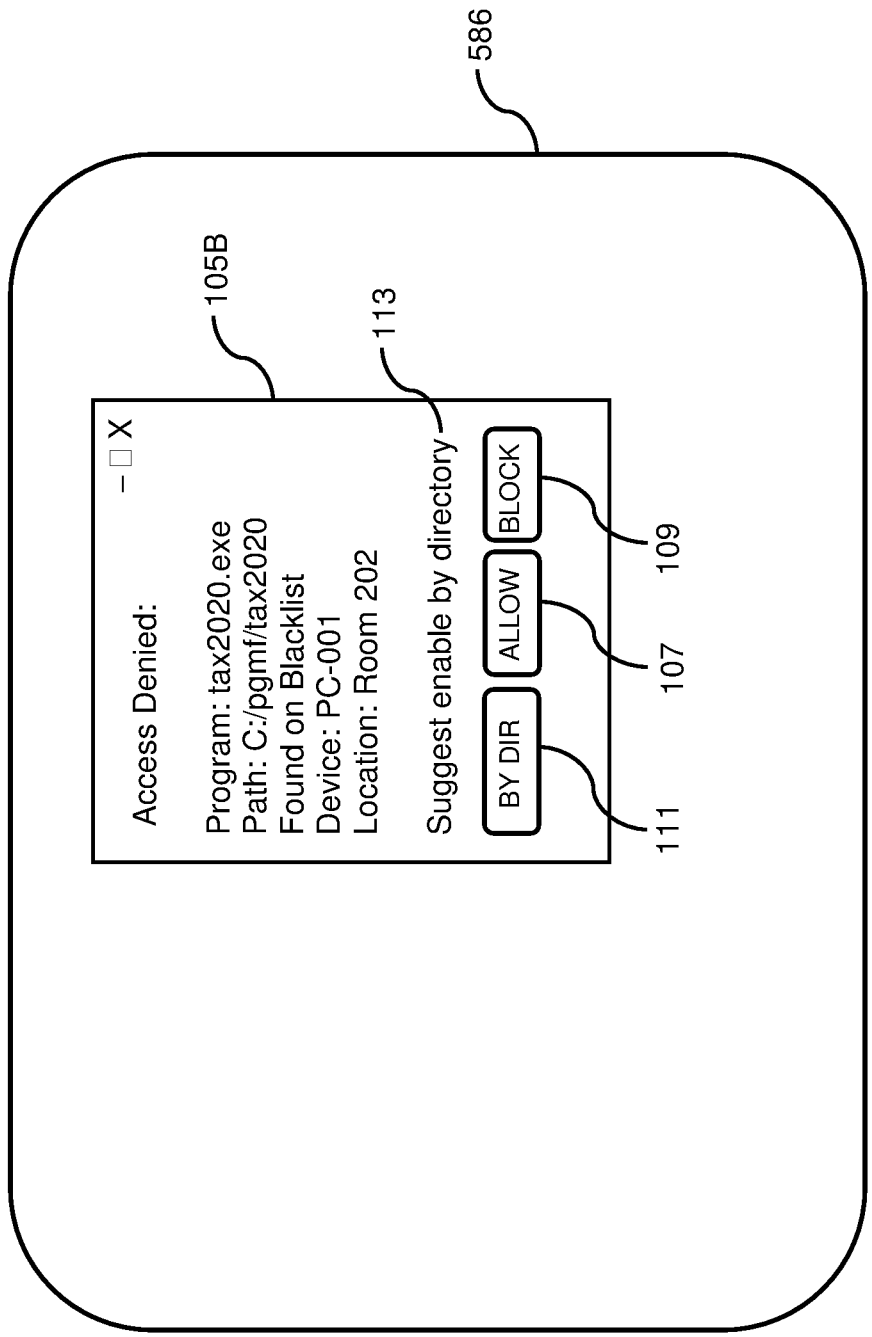
FIGS. 6B, 6C, 6D, and 6E illustrate computer user interfaces of the computer security system.
Figure 6C:
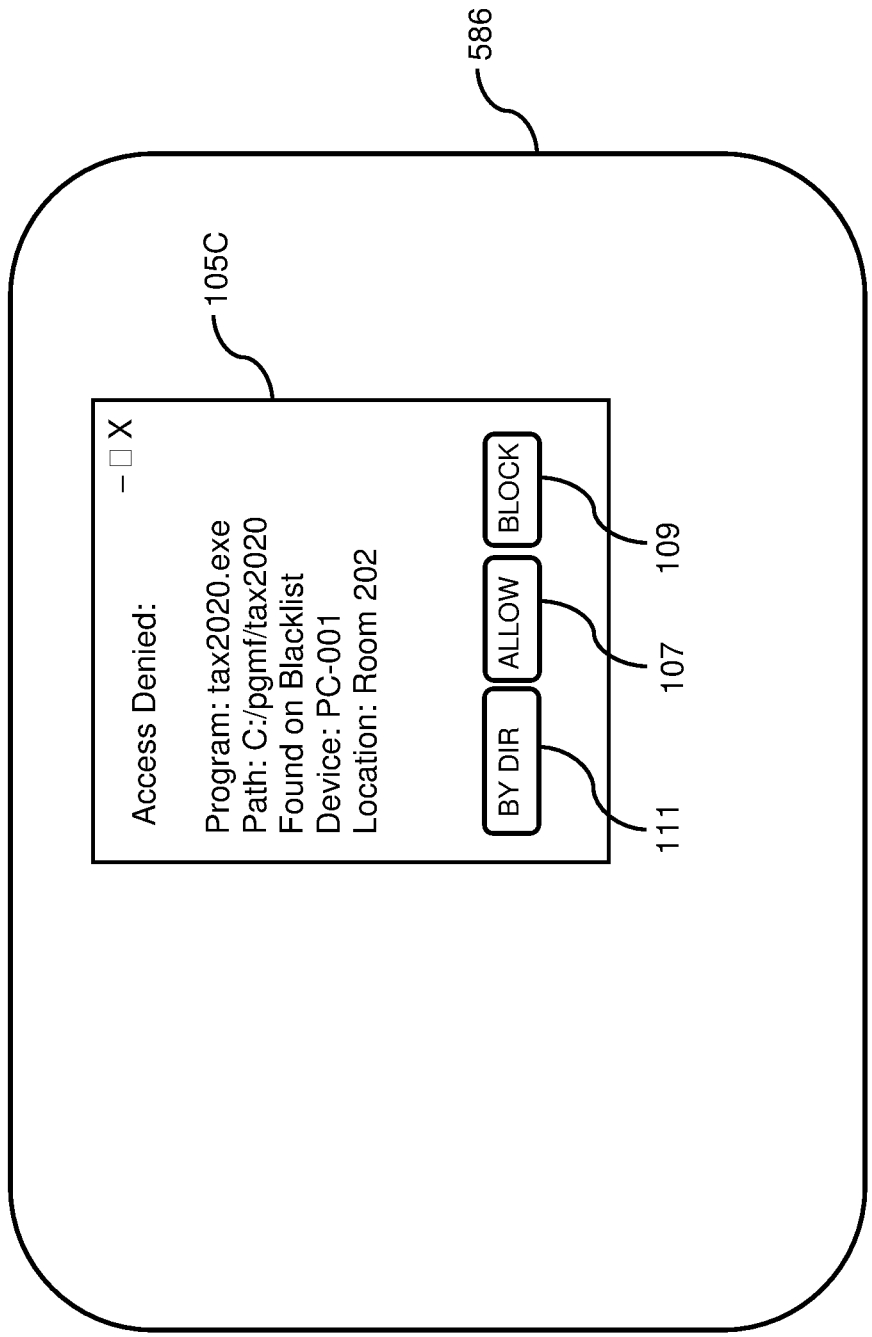
Figure 6D:
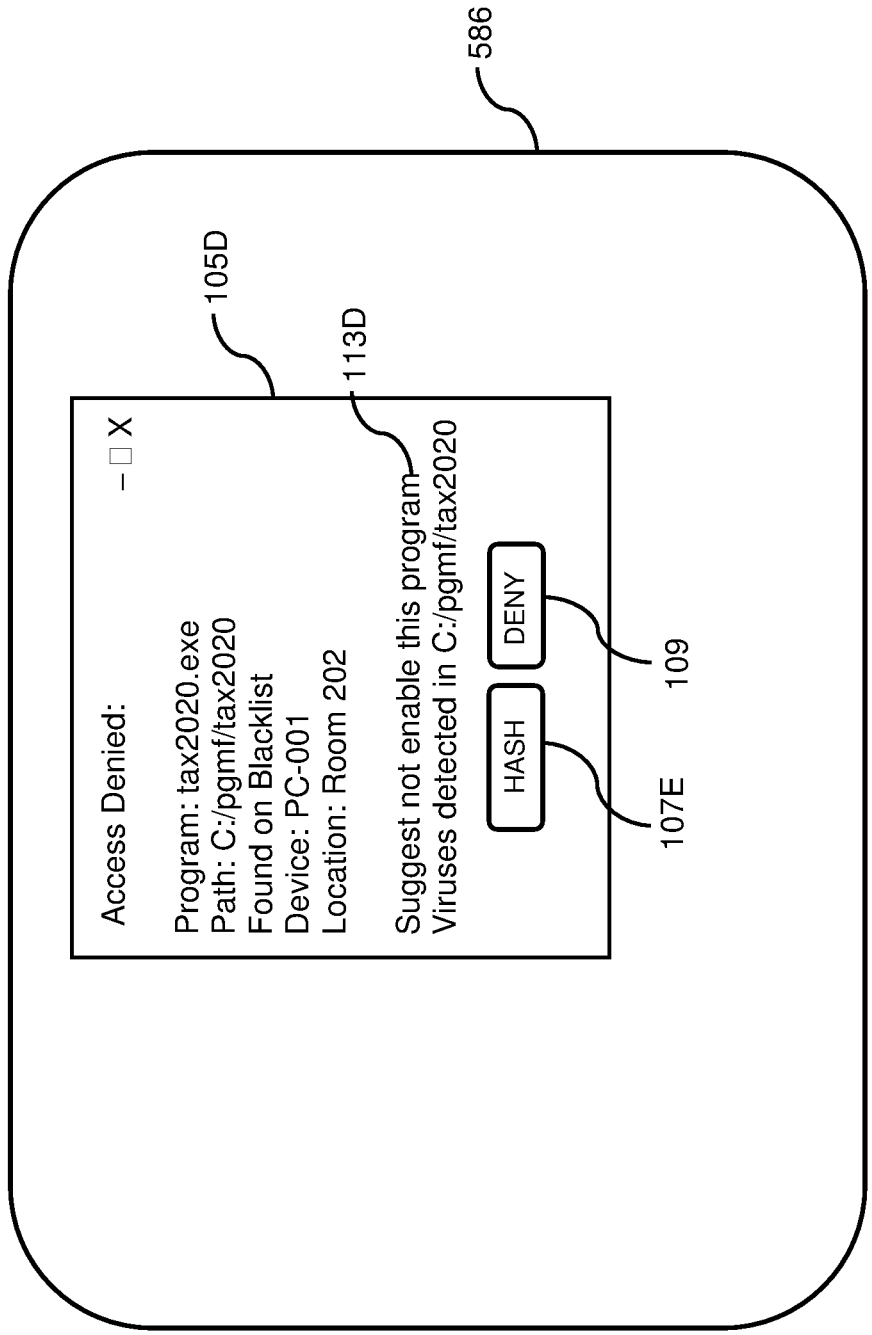
Figure 6E:
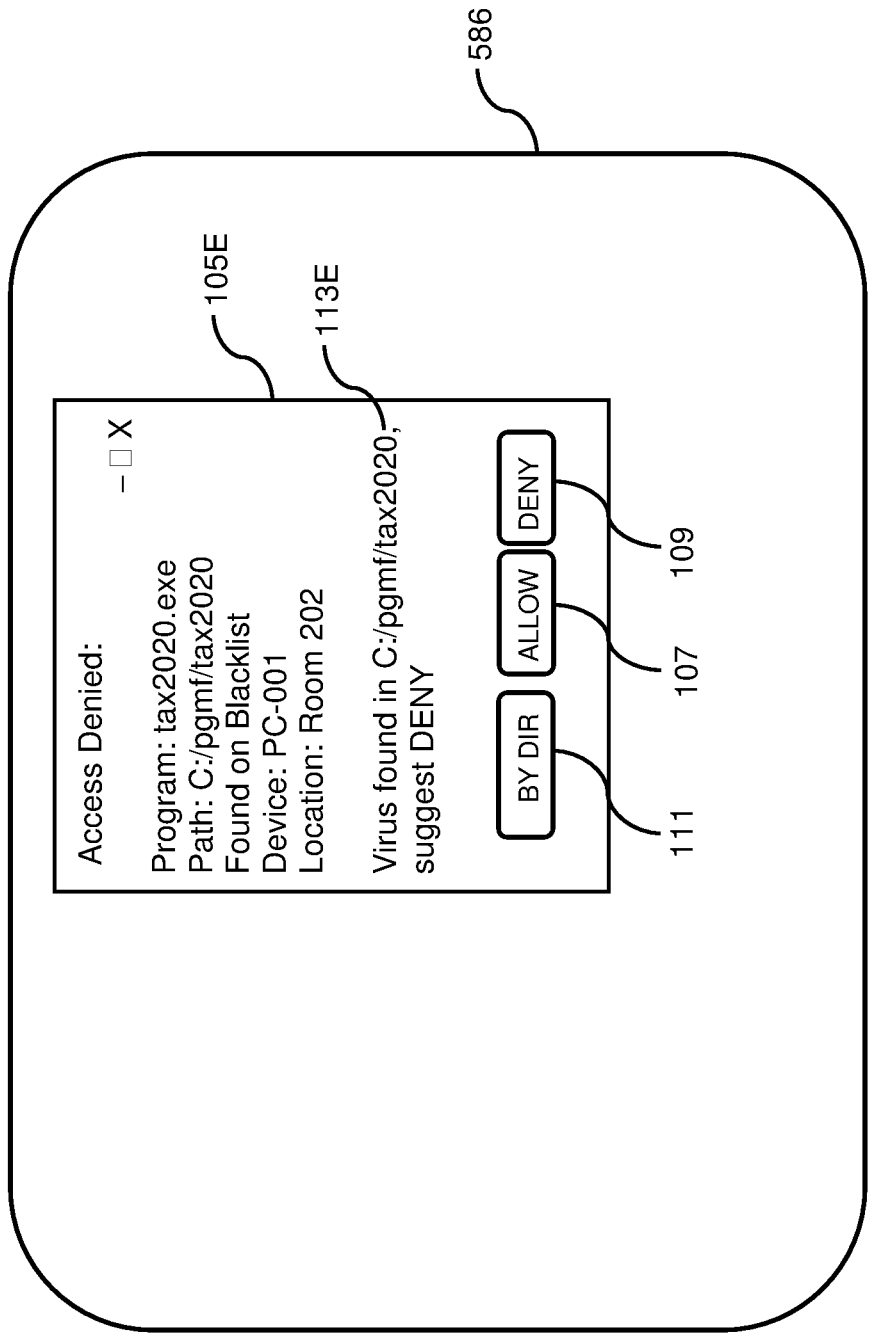

An enhanced administrative interface 105B is shown in FIG. 6B, providing a directive to allow a class of programs 14 to run that reside in the same directory or file folder.

For example, if a user is using a tax preparation software package, every time the user starts that tax preparation software package, the tax preparation software package checks for updates as tax laws change daily, downloads new software, and the tax preparation software package restarts. If a virus masquerading as the tax preparation software package is discovered, the tax preparation software package added the blacklist 15 and any legitimate copies of the tax preparation software package would not be allowed to run. Instead, given the history and execution environment of the tax preparation software package, an analysis is made by heuristics and, based upon acquired intelligence and history, it is recommended that the administrator allow execution of the tax preparation software package based upon the directory or folder from which it is executed (e.g., "C:/program files/mytax2022"). In this way, suspect copies of the tax preparation software package running from other folders/directories are blocked by the blacklist 15, while the valid copy of the tax preparation software package running from the allowed directory are allowed to execute.

Although there are many anticipated ways to make this intelligent recommendation, one example includes the file location from which the program 14 comes. In one example, if the program 14 is stored in a directory from which other program(s) are stored and those other programs are not in the blacklist 15, then there is a greater chance that the program 14 is benign, as virus software usually tries to hide in directories that are rarely visited. As an example, when a user that often executes one program that is stored in a directory "C:/PgmFiles/mytrustedapps," tries to run another program from that same directory, it is more than likely that the second program is benign. In such, upon approval of the administrator, execution of any program in said directory (program classification) will be permitted. It is also anticipated that, in some embodiments, when it is uncovered (local, company-wide, or worldwide) that a program is detected to contain malware that is stored in this directory, such approval will be revoked. Therefore, as malware evolves and someone creates malware that utilizes this directory, the server computer 500 receives such information and the administrative software 917 and the computer security system software 17 invalidates the entry allowing execution of the program based upon directory in the whitelist 15. In this, the administrator will need to update the whitelist 19 and add entries for whichever programs are now known to be benign that reside in the directory that was removed from the whitelist 15.

As shown in FIGS. 6B-6E, at some time after the attempt to run a program 14 (e.g., after receiving a call from the user or during routine operations), the administrative software 917 uses the described heuristics to make one or more suggestions 113 (or options) to the administrator in an enhanced user interface 105B, either before the administrator attempts to process the program or as part of the administration of the program. In some embodiments, the suggestions 113 are accompanied with a set of possible actions related to the suggestions. For example, if the program 14 is in a program classification of "all programs in a directory/folder," then the suggestion 113 is to allow by folder. The possible actions are allow-by-folder, allow by hash, allow by filename, deny.

In other embodiments, the administrator is provided with selections for all possible ways to add an override to the whitelist 19. Then, upon making a selection, in some embodiments, the heuristics are run to verify what the administrator has selected and, if the verification indicates an issue, the administrator receives guidance as to the best way to add the override to the whitelist 15.

It is fully anticipated that the described heuristics analyze the program and associated data (e.g., historical data) before or after the administrator is presented with an administrator interface (e.g., enhanced administrator interface 105B) and the heuristics are used to provide suggestions and/or enable or prevent options for the enhanced administrator interface 105B. For example, if a known virus is known to have the same program name (e.g., tax2020.exe), then in some embodiments, the enhanced administrator interface 105B lacks an option to add an override for the program 14 to the whitelist 15 and only presents an option to add the program 14 by hash value so that if the program is modified or replaced (e.g., by a different program having a virus and a different hash value), then the different program will not match the hash value and will not be allowed to run.

It is also fully anticipated that the described heuristics analyze the program 14 and associated data after the administrator is presented with an administrator interface (e.g., administrator interface 105C) and the heuristics are used to provide feedback and/or enable or prevent options for the administrator interface 105C. For example, if a virus is known to install into a program with the same program name (e.g., tax2020.exe), then in such embodiments, when the administrator selects the by-directory option 111, the warning administrator interface 105D is presented, and the administrator can only choose to allow by hash value 107E or deny 109 (e.g., add to the blacklist).

In the administrator interfaces 105B/105C/105D/105E, a description of the program is provided to the administrator, along with a suggestion 113 (if any), which in the enhanced administrator user interface 105B is a suggestion 113 to enable execution of programs in the same directory, perhaps because one or more target computers 10 have run one or more of the same or different programs from that same directory in the past few weeks. In the enhanced administrator interface 105B, the administrator has the ability to select allow 107 just that program (as in the past), deny 109 (not allowing execution of this program—e.g., adding the program to a blacklist), or allowing programs in the same directory by way of the by-directory option 111.

Note that there are many ways to implement a blacklist 15 in which a single entry (or record) within the blacklist 15, all of which are anticipated here within. The message that appears in the enhanced administrator interface 105B is based upon analysis of the program that is attempted to be run with respect to various aspects of the program such as the program's name, certificate, path/folder, etc. In some embodiments, history is used to suggest a blacklisting/whitelisting strategy, including historic blacklisting by other administrators either within the same company or worldwide. For example, if the program is called "chrome.exe" and was previously enabled by hash value and each time an update to "chrome.exe" is made/loaded, the hash value does not match, the message window of the enhanced administrator interface 105B will suggest the administrator add an override entry to the whitelist 19 so that future executions of that program name in a specific directory are allowed and the user does not find the error the next time "chrome.exe" is updated. Further, if many administrators in the same organization or world-wide have blacklisted "chrome.exe" running out of a specific directory, then the message window of the enhanced administrator interface 105B would suggest blacklisting "chrome.exe" by name and adding an override to the whitelist 19 that allows execution in a known folder. Further, if many other administrators have blacklisted several programs in the same folder, then the message window of enhanced administrator interface 105B will suggest blacklisting the entire folder, etc.

In some embodiments, it is already known that some form of malware utilizes a specific directory such as a download directory or temporary files directory. In such, the server computer 500 periodically receives such information to the administrative software 917. In some embodiments, the administrative software warns the administrator not to enable this program by a suggestion 113D/113E in the warn administrative interface 105D/105E. In other embodiments, the administrative software 917 prevents the administrator from allowing execution of programs found in the requested directory and presents a message administrative interface informing the administrator that the program will not be allowed to run on any system.

Figure 5:
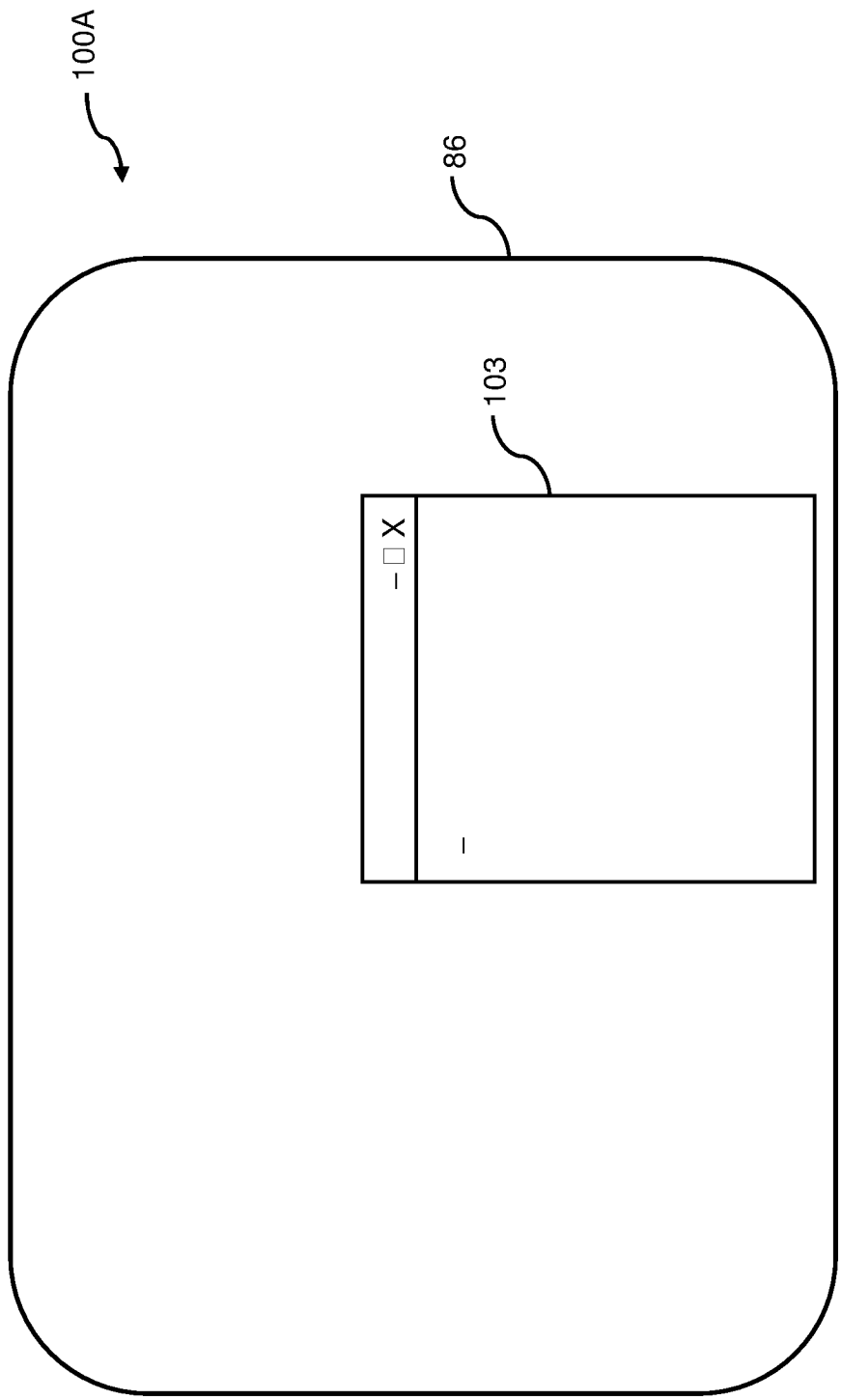
FIG. 5 illustrates a second computer user interface of the computer security system.

If it is determined that the program 14 is not on the blacklist 15 and allowed to execute, the program 14 executes as shown in a user interface 100A of FIG. 5, for example, displaying a user interface window 103.

If, after an attempt to execute the program 14, the program 14 is found in the blacklist 15, the program 14 is prevented from executing and a user interface 100B of FIG. 6 is presented, displaying an error message 105. In some embodiments, after such attempt, information about the attempted execution, the program name, program content, date/time, etc., are logged and/or transmitted to the server computer 500 where the administrative software 917 analyzes the information.

The table of FIG. 7 depicts one implementation of a blacklist 15 and/or whitelist 19. For efficiency, it is anticipated that in some embodiments, a blacklist 15 or whitelist 19 be implemented as a hash table for compact storage and faster access. In some embodiments, there are separate blacklists 15 for each type of blacklisting, for example, one for blacklisting by hash value, one for blacklisting by program name, etc. In this example, there is a single blacklist 15 (or whitelist 19) arranged in linear fashion with entries for each type of blacklisted element (program or directory) in the same blacklist 15.

As an example, using the blacklist 15 of FIG. 7, when an attempt is made to run a program 14, the name of the program 14 is searched in the blacklist 15 (or program name range using wild card or regular expression characters as in "w??word.exe"). If the program name is found, the program 14 is prevented from running. If the program name is not found, a hash value of the program 14 is calculated and the blacklist 15 is searched for that hash value. Note that hash algorithms are known and well-understood in the field of programming. If the hash value is found in the blacklist 15, the program 14 is prevented from running. Next, the signature of the program 14 is extracted (if the program is signed) and the blacklist 15 is searched for the signature. If the signature is found, the program 14 is prevented from running. If the signature is found, the directory in which the program 14 is located is determined and the blacklist 15 is searched for that directory. If the directory is not found, the program 14 is run as the program 14 is not in the blacklist 15. If the directory is found, then it is determined that the program is in the blacklist 15 and not allowed to run, unless an entry in the whitelist 19 allows the program 14 to run.

In some embodiments, each entry of the blacklist 15 includes information regarding the program or directory such as the date of last change, the name of the program 602, a hash value 604 of the program 14, and a signature of the program 606. In some embodiments, more or less information is maintained in the blacklist 15. Note that as malware becomes more sophisticated, the malware often masquerades as known, valid programs such as word processors. The hash value 604 of the program 14 is one way to prevent this type of masquerading, as a hash value of a malware version (e.g., having the same name as the valid program) will often be different that a hash value 604 of the program 14, as the malware version of the program will have different internal coding (e.g., the malicious code). In some embodiments, the hash value 604 of the program 14, for example is based upon a summation/modulus or other numerical calculation based upon the entire program 14 or a portion of the program 14. Any tampering with the program 14 by, for example, a hacker, will change the calculation, resulting in a mismatch between the calculated hash value and the hash value 604 of the program 14 from the blacklist 15, even if a size of the file in which the program 14 is stored matches the size of the valid program.

In some embodiments, identification is by a signature of the program 606 as provided in the blacklist 15. The signature of the program 606, for example is based upon a probing of the entire program or a portion of the program. For example, the presence or absence of certain strings within the program, values at certain locations within the program, etc. Any tampering with the program 14, for example, by a hacker, will change a calculation of the signature(s), resulting in not finding certain expected values within the signature based upon the signature of the program 606 from the blacklist 15.

Figure 7A:
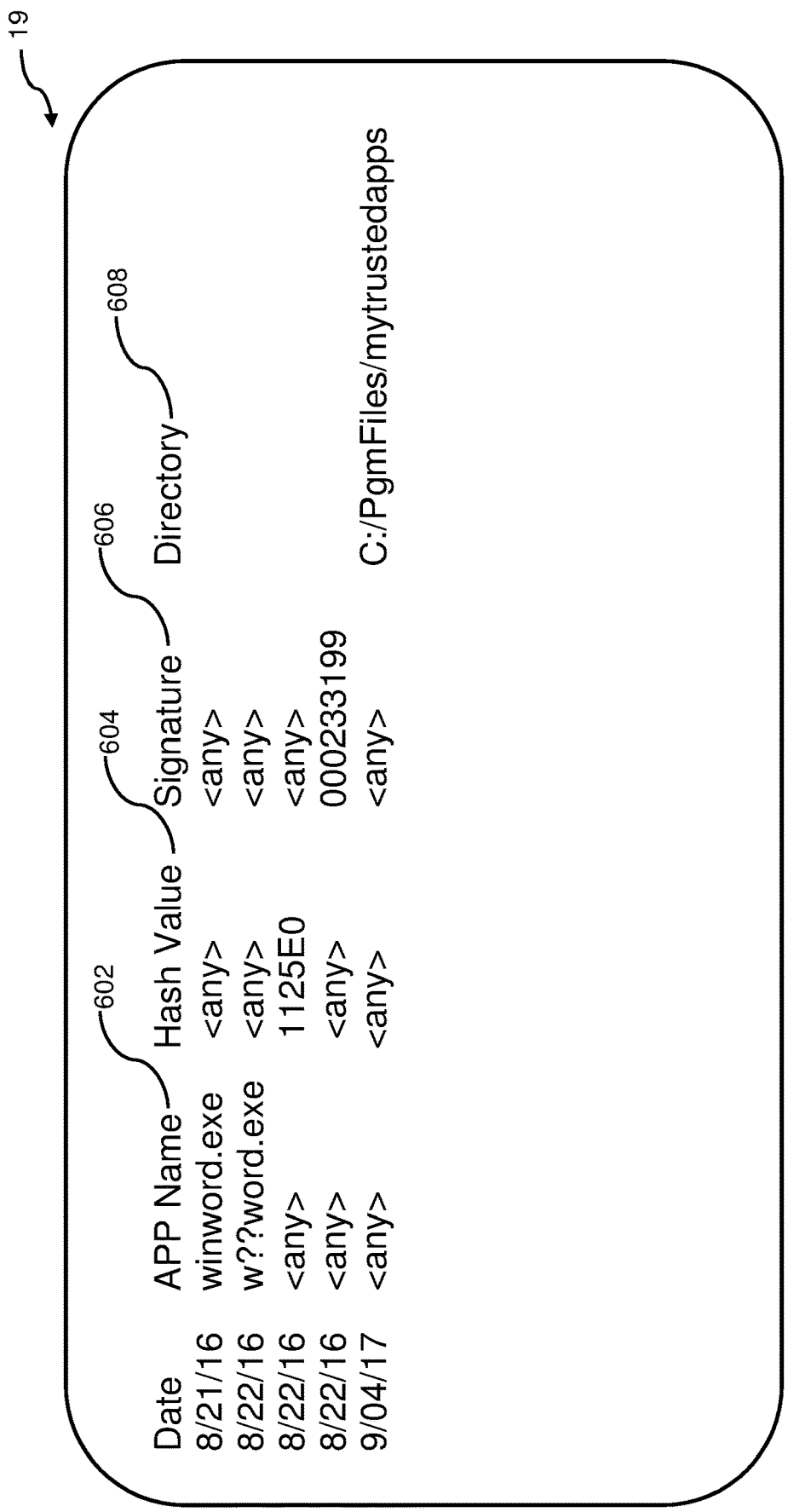
FIG. 7A illustrates an exemplary whitelist of the computer security system.

Referring to FIG. 7A, an exemplary whitelist 19 is shown. In this exemplary whitelist 19, an override entry was added on Sep. 4, 2017, indicating that programs 14 stored within the folder 608, C:/pgmFiles/mytrustedapps, are trusted. In other words, the user tried to execute a program from the folder 608 C:/PgmFiles/mytrustedapps and when the enhanced administrator interface 105B was presented to the administrator (see FIG. 6B), the suggestion 113 was "enable by directory" and the administrator invoked the by-directory option 111. In this example, once approved, any program 14 that executes in the folder 608 C:/ProgramFiles/mytrustedapps will be allowed to execute.

Note that the entries include "<any>" for certain fields of the blacklist 15 and whitelist 19. For example, in the first line of this exemplary whitelist 19, the name of the program 14 would have to match "winword.exe," but the program 14 can have any hash value, any signature, or be located in any directory. If both name and folder have values, then in order to run the program 14, the name of the program 14 would have to match the name from the whitelist 19 and the program 14 would have to be executing out of the identified directory.

Figure 8:
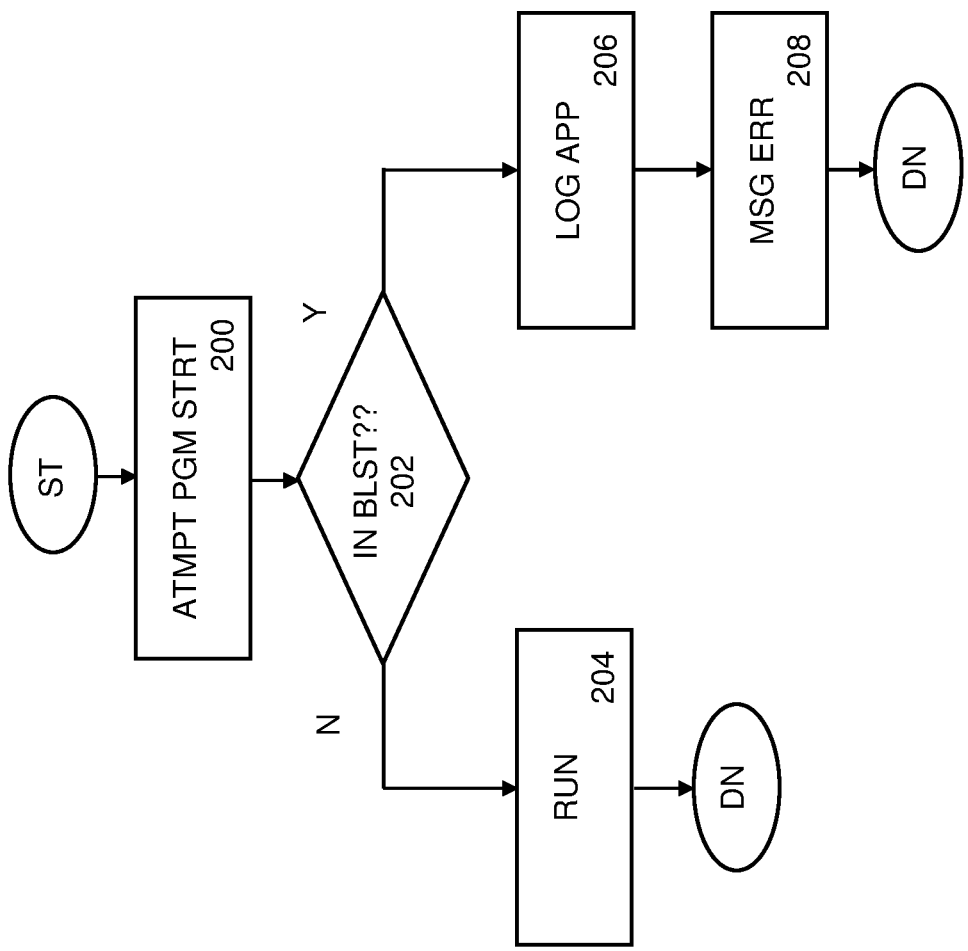
FIGS. 8-10 illustrate exemplary program flows of the computer security system.
Figure 9:
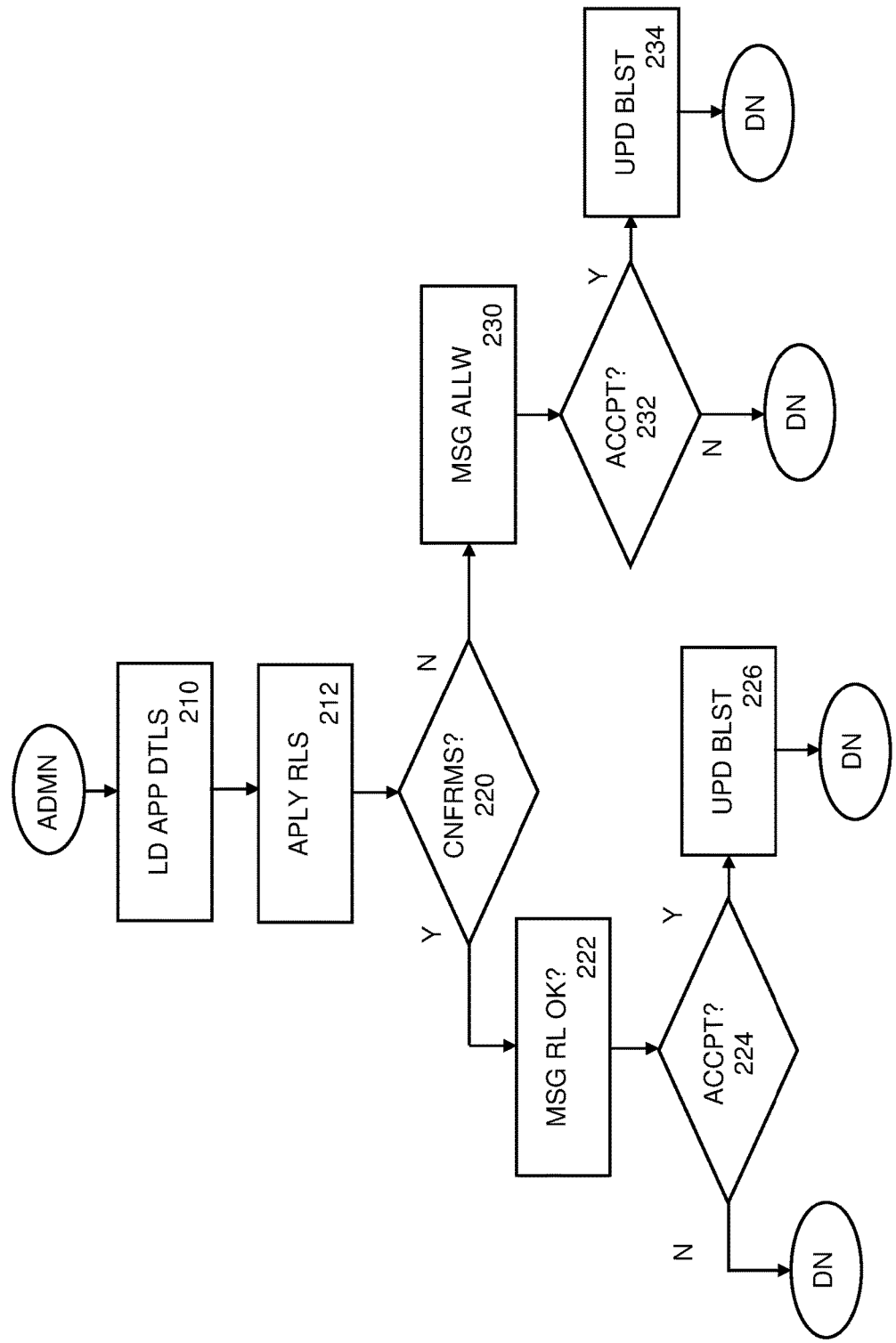
Figure 10:
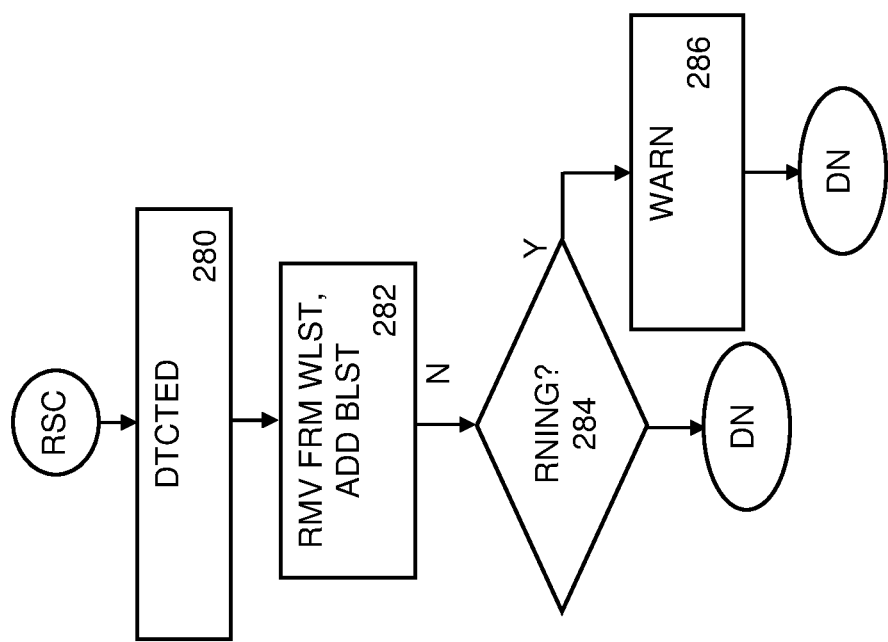

Referring to FIGS. 8-10, exemplary program flows of the computer security system are shown.

It is anticipated that portions of the exemplary program flow execute on a user device such as the target computer 10 while portions of the exemplary program flow execute on the server computer 500 in any combination and on any known computer.

In this example, the flow starts by a program 14 attempting to start 200 on the target computer 10. This step is anticipated to be performed through direct or indirect invocation by a user of the target computer 10. In a direct invocation, the user knowingly tries to start the program 14 (e.g., software executable, application, etc.), for example, by double-clicking on a shortcut or icon of that executable. In an indirect invocation, the user initiates execution of an executable by indirect ways such as browsing to a web site, opening an email attachment, etc.

The computer security system software 17 determines 202 if the program 14 is in the blacklist 15 using any searching mechanism, including linear searching, binary searching, hash searching, etc. For example, the name of the program is searched and if found, the search is successful. If the name is not found, then a hash value is calculated for the program and the hash value is searched and if not found, other searches are performed.

If it is determined 202 that the program 14 is not in the blacklist 15 (e.g., the program is trusted) the program 14 is run 204.

If it is determined 202 that the program 14 is in the blacklist 15 (e.g., the program is not trusted), the program 14 is prevented from running and, in some embodiments, the computer security system software 17 records data 206 regarding the attempt including, for example, the name of the program 14, directory in which the program 14 is located, user identification (who tried to run the program), time/date, etc. In some embodiments, a message is sent or displayed 208 to an administrator of the target computer 10. This part of the process competes without running of the program 14.

In FIG. 9, program flow of a sample administrative program is shown. At some time after a program 14 is prevented from running as per FIG. 8, the administrator of the target computer 10 discovers this event. In some cases, by a message as per FIG. 8, in some cases, by scanning the log files, and in some cases, by a user contacting the administrator requesting approval to run the program 14.

In such, application details are accessed 210 from the stored data (e.g., log file) and a set of rules are applied 212 to determine how to handle the program 14. If the program 14 does not conform 220 to the rules, a message is displayed 230 to the administrator requesting if the administrator wishes to allow this program 14 to execute in the future. If the administrator accepts 232 the program 14 to execute, the blacklist 15 and/or whitelist 19 for the target computer 10 is updated 234 (and in some examples, other computers), otherwise the administrative program is finished without updating the blacklist 15 or whitelist 19, and therefore, the program 14 will not be allowed to execute. Note that, in some embodiments, the blacklist 15 for the target computer 10 is a blacklist 15 that is common across several of the target computers 10, for example, all end-user computers in an organization.

If the program 14 conforms 220 to any of the rules to make a decision that extends beyond allowing only that program 14, a message such as those in FIGS. 11-15 is displayed, depending upon the rule that applies to this particular program 14. For example, if the program executes from a safe directory, the administrator is able to add an override to the whitelist 19 to allow all programs stored in that directory. If the program 14 conforms 220 to any of the rules to make a decision that extends beyond allowing only that program 14, in some embodiments, a selection message 222 is displayed asking the administrator to allow all programs the conform to the one specific rule to make a decision that extends to a class of the programs 14 that are beyond allowing solely that program 14, similar to the user interfaces of FIGS. 11-16. Note that it is anticipated that when the program conforms to multiple specific classes (e.g., rules), either the best rule is selected (e.g., the safest rule) or the user is prompted to select one rule out of the multiple rules presented. If the administrator does not accept 224, the flow completes without removing the program 14 from the blacklist 15. If the administrator accepts 224, the whitelist 15 is updated 226 to add the override (and in some examples, updated on other computers) and future attempts to run the program 14 and those programs 14 that conform to the rule will be allowed. In some embodiments, the selection message 222 is not displayed, the whitelist 15 is automatically updated 226 with an override and future attempts to run the program 14 and those programs 14 that conform to the rule will be allowed. In some such embodiments, where the rule indicates multiple programs are in the blacklist 15 that are stored in or executed from the same folder as the program 14, the override is not presented/allowed.

Examples of such classes of programs 14 include all programs 14 residing in a particular directory, all programs 14 signed by a certain authority, all programs 14 of a certain name, etc.

In FIG. 10, malware was detected 280 somewhere, either on one of the target computers 10 or anywhere in the world, and such was communicated to the administrative software 917 that runs on the server computer 500. Responsive to the detection, the administrative software 917 removes 282 any entries from the whitelist 19 that would allow execution of the program 14 that was detected 280 and add an entry to the blacklist 15 to exclude the program 14 having the malware. If it is found that the program 14 having the malware is already running 284 on any target computers 10, warning messages 286 are displayed by the computer security system software 17 running on the target computers 10 to warn the user that this program 14 is currently running and it is potentially dangerous and may include malware. In this way, the user can reboot the target computer 10 or use a task manager to kill the already running program. In some embodiments, the program 14 that is currently running is automatically stopped by the computer security system software 17 that is running on the target computer 10.

Referring to FIGS. 10-16, exemplary administrator interfaces of the computer security system are shown. Administrative interfaces are provided for allowing or blocking certain programs on an individual computer or a set of computers. In general, any authorized user (e.g., administrator, IT person) is able to adjust blacklists to accommodate individual programs or a set of programs on one or more computers.

Figure 11:
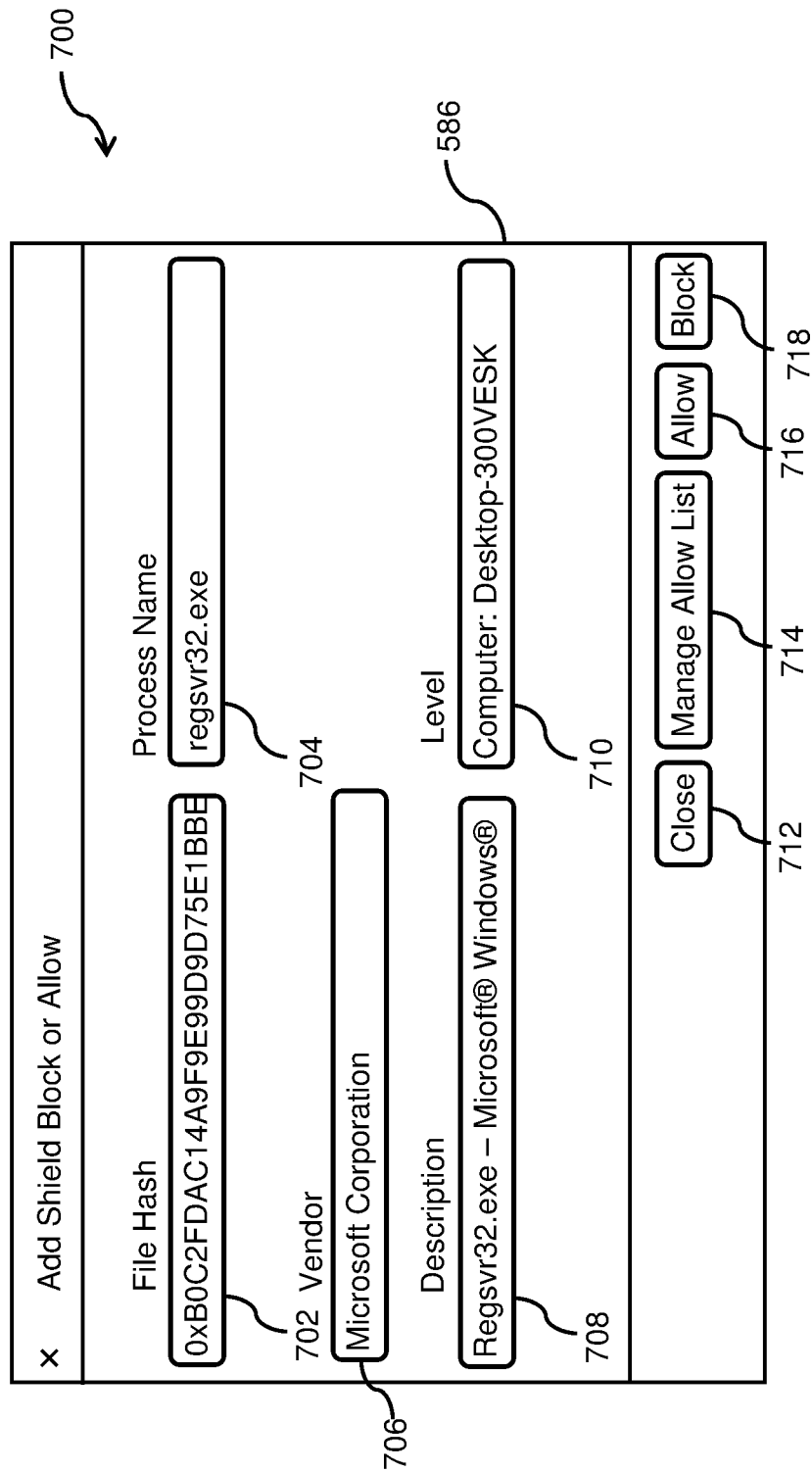
FIGS. 11-16 illustrate exemplary administrator user interfaces of the computer security system.

In the example of FIG. 11, an attempt to run a program named "regsvr32.exe" was made and the block or allow administrator interface 700 is displayed. The hash value 702 of the program and name 704 of the program are displayed, along with the vendor/supplier 706, and a description 708 of the program are displayed. In this example, the level 710 has been selected to be "Computer" meaning that this program will only be allowed or blocked on a single target computer 10 (as opposed to all computers in the company, in an account, or in a group in which the user's computer resides). If the "close" feature 712 is selected, nothing happens and the administrator interface exits. If "Manage Prevent List" 714 is selected, the administrator is taken to a report administrator interface 740 (see FIG. 16). If the "allow" 716 feature is selected, the identified program is removed from the blacklist 15 (list of programs that are deemed malicious or unwanted) and future attempts to run the identified program are allowed on all computers in the selected level 710. If the "block" 718 feature is selected, the identified program is added to the blacklist 15 and, in embodiments having a whitelist, the identified program is removed from the whitelist (list of allowed programs) on all computers in the selected level 710.

Figure 12:
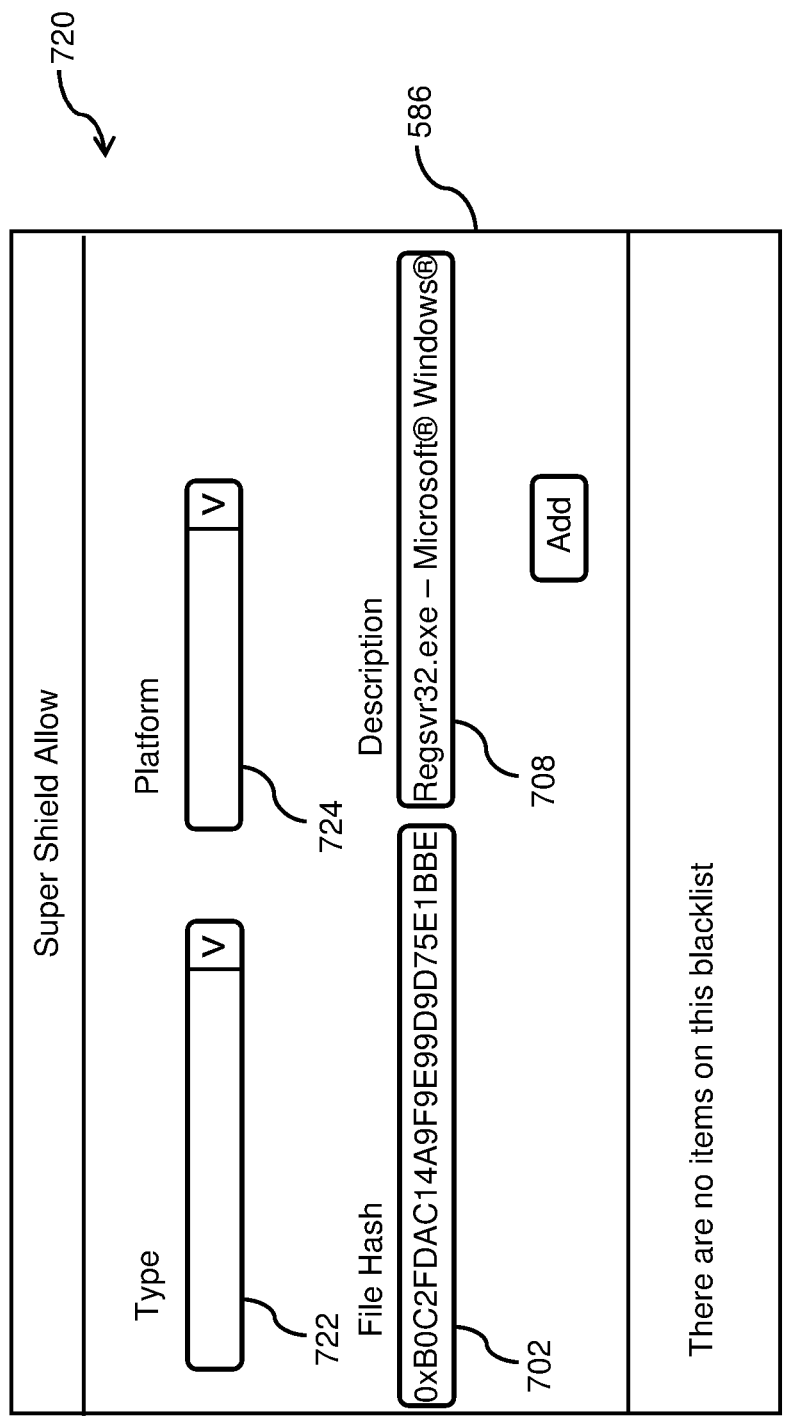
Figure 13:
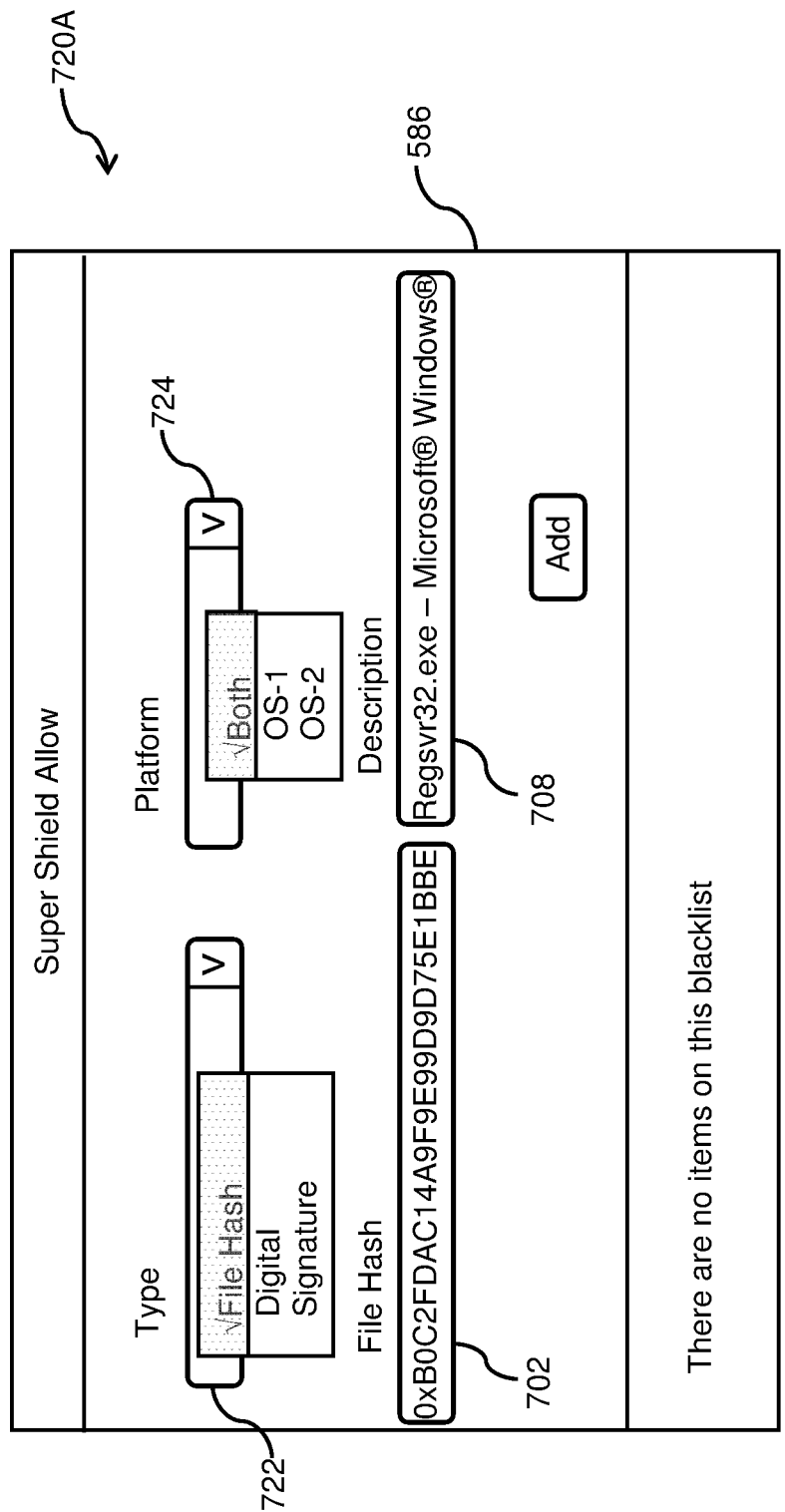

In the example of FIG. 12, an allow administrator interface 720 is displayed. In this, the administrator is prompted to add a program to the whitelist 19 to allow operation of the program on one or more computers. In FIG. 12, the hash value 702 for the program is displayed and a description 708 of the program is displayed (or entered by the administrator). In FIG. 13, the allow administrator interface with pulldowns 720A is shown indicating that the administrator has selected "file hash" as the type and other types are noted such as "Digital" and "Signature." The user has selected "Both" as the platform 724 as the platform and other platforms are noted such as "OS-1" and "OS-2" as many enterprises use computers running different operating systems from different suppliers.

Figure 14:
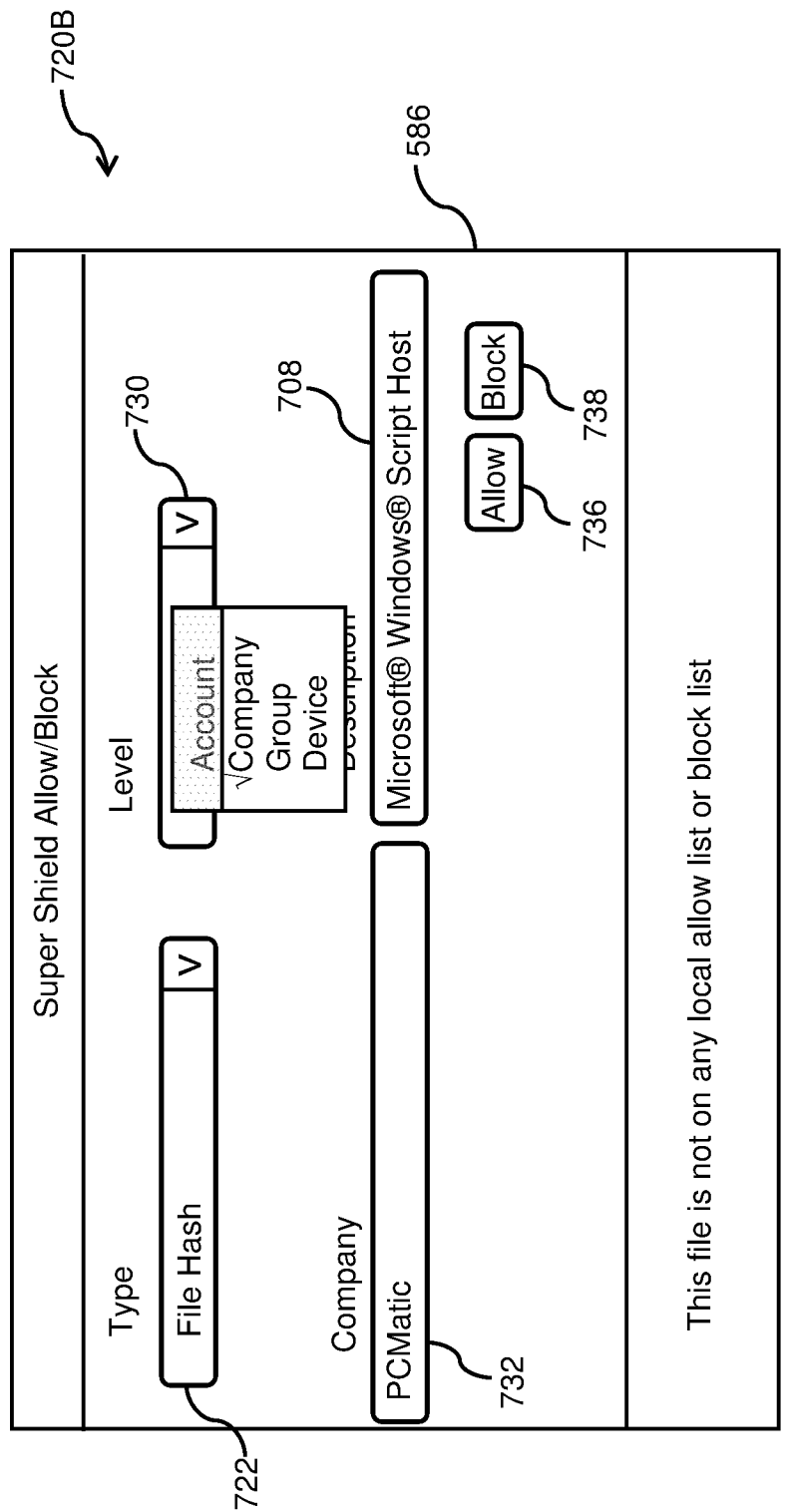
Figure 15:
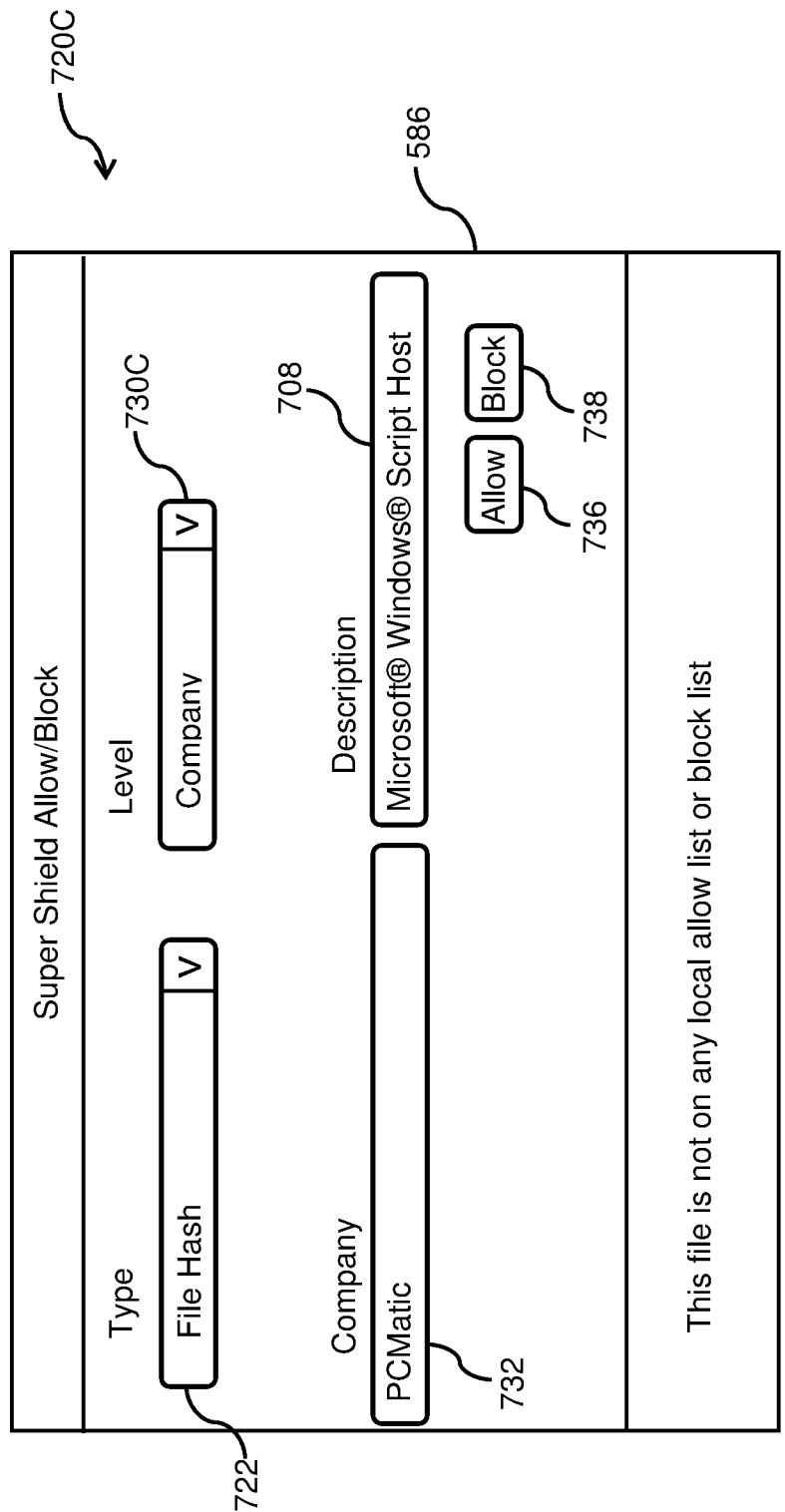

Once done, the administrator selects "add," and a new administrator interface 720B/720C of FIG. 14 is shown indicating the previously selected type 722 ("File Hash") and allowing the administrator to select a level 730 such as "account," "company," "group," or "device." Note that "company has been selected as the level 730C and the name of the company 732 is displayed. At this point, the administrator has the ability to select "allow" 736 to add this program to the whitelists 19 of all computers associated with the selected level 730 (e.g., all computers in the company) or to select "block" 738 to not add this program to the blacklists 15 of all computers associated with the selected level 730 (e.g., all computers in the company).

Figure 16:
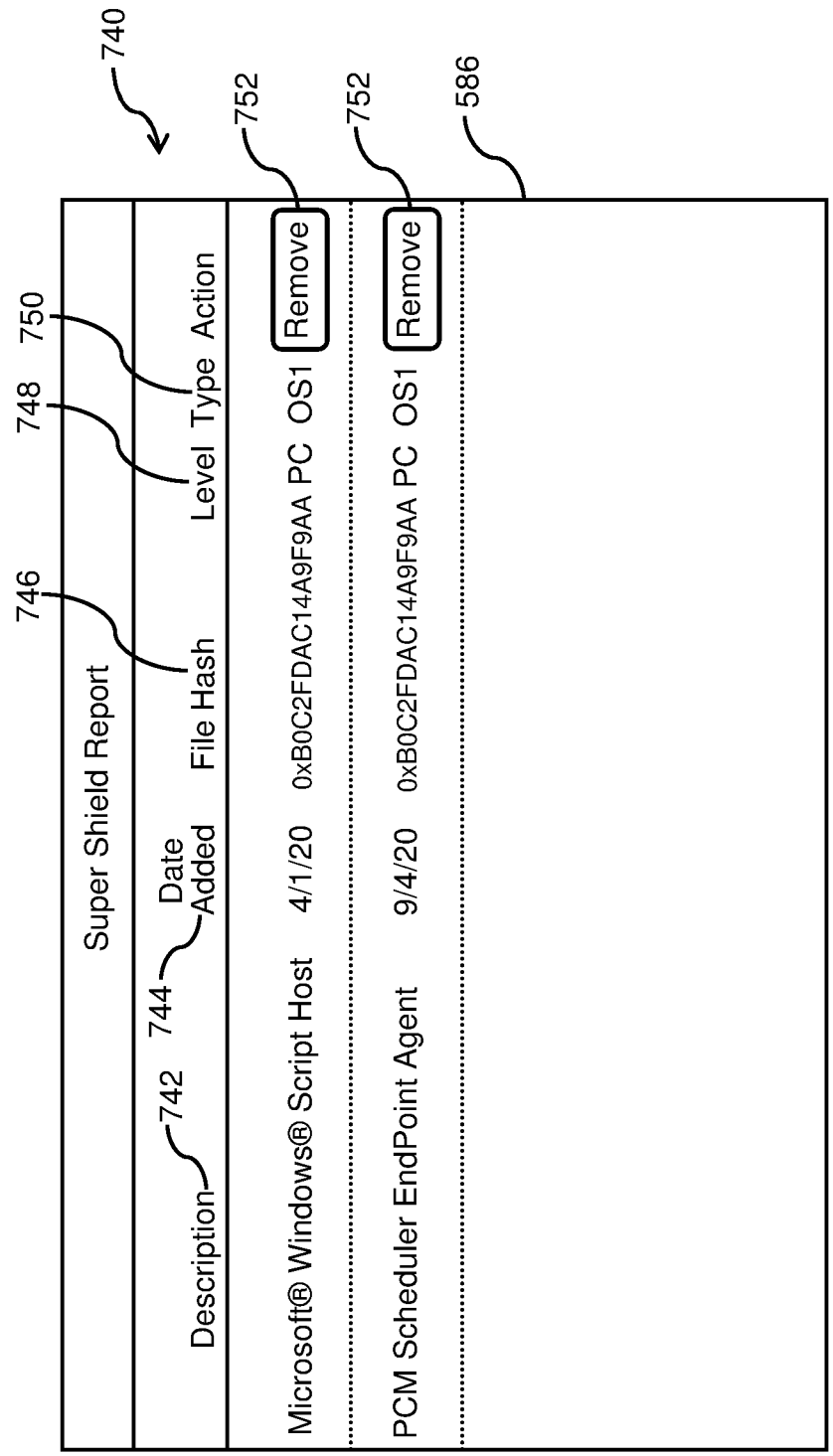

To review and/or adjust the whitelists 19 (or blacklists 15), a report administrator interface 740 as in FIG. 16 is used listing a description 742 of each program in the list, a date added/changed 744 for each program in the list, a file hash value 746 for each program in the list, a level 748 for each program in the list, and a type 750 for each program in the list. Note that for each program, there is a "remove" feature 752 that, upon selecting, the associated program will be removed from the list (whitelist 19 or blacklist 15).

By providing the above noted administrator interfaces or similar administrator interfaces, the administrator (e.g., administrator of the target computer 10, information technology staff, etc.) is provided the ability to make local or global changes to the whitelists and/or blacklists of the target computer 10 or a collection of computers that will allow or block programs having the defined characteristics (e.g., all programs having a certain name, all programs having a certain digital certificate, all programs executing from a specific directory, etc.). By making whitelisting/blacklisting more convenient and manageable, the users and administrators will be more accepting of whitelisting/blacklisting and the users/company will be generally more secure through the protection provided.

It is fully anticipated that the disclosed computer security system performs the same or similar steps regarding blacklisting a program. In commuter security parlance, a blacklist 15 defines a set of programs that are explicitly not allowed to run on the target computer 10. It is fully anticipated that in some embodiments of the computer security system with enhanced blacklisting, the blacklist 15 includes entries for programs 14, as well as classes of the programs 14. In such embodiments, when the administrator is blacklisting a program(s) 14 or class of the programs 14, the computer security system with enhanced blacklisting uses the same or similar heuristics to make recommendations or present selections based upon the program 14, class, and/or historical activities/actions. For example, if the administrator wants to block a game program from being run from the folder/system/games, the computer security system with enhanced blacklisting recognizes that this folder includes other games and suggests blacklisting of the folder. In a similar way, if the administrator wants to block a game that is stored in/system32 and is attempting to block all programs 14 in that directory, the computer security system with enhanced blacklisting recognizes the number of valid programs 14 historically run from/system32 and suggests that the administrator add only by program name the program 14.

Given all of the above, consider an information technology (IT) organization having responsibility for many target computers 10, perhaps thousands of target computers 10.

Each target computer 10 typically has one or more users and when a user tries to run a program or script that is blocked, the user must consult with the IT organization to enable that program to run so that the user is able to perform their job function. Consider that many software packages and operating systems provide automatic updates, periodically installing updated programs and/or scripts on the target computers 10 or several users learning about a new program and these users, over a period of a few days, trying to run that new program and being blocked, the IT organization will receive many requests to enable the updated program or new program from many users. As there are often several personnel in the IT organization answering such requests (e.g., several shifts, each having a few technicians), it is anticipated that these requests are spread out across several technicians and, therefore, it is difficult for each technician to see a trend.

Figure 17:
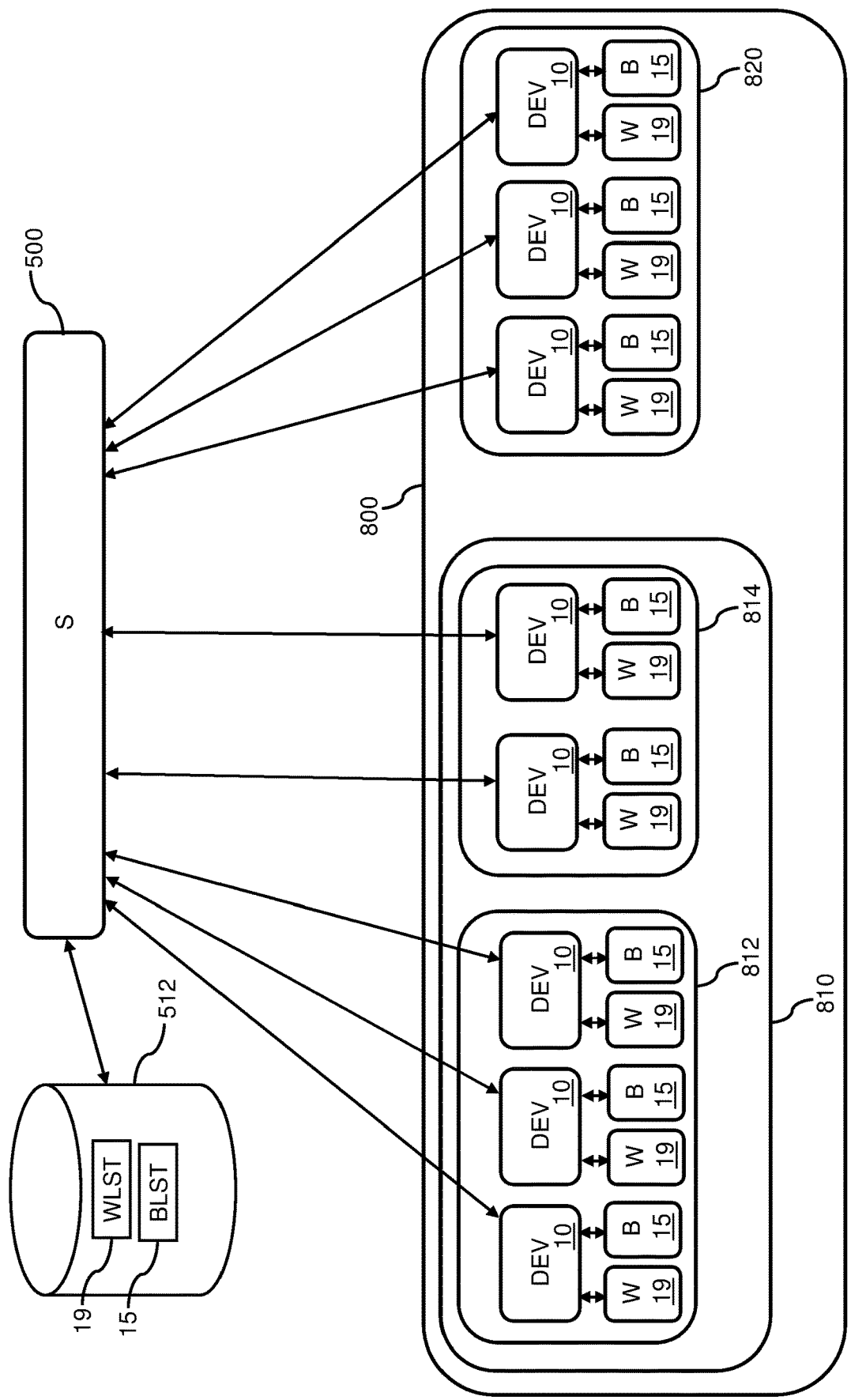
FIG. 17 illustrates a schematic view of a simplified organization in which whitelists/blacklists are administrated by a central authority (e.g., an information technology team).

Referring to FIG. 17, a simplified organization 800 is shown having multiple devices 10, each device 10 having a whitelist 19 and a blacklist 14. This exemplary organization 800 is divided into two sub-organizations 810/820. The first sub-organization 810 (e.g., marketing) has two departments 812/814 (e.g., direct marketing and indirect marketing). The second sub-organization 820 has no sub-departments, for example, administration including the CEO, VP, and CFO.

Figure 18:
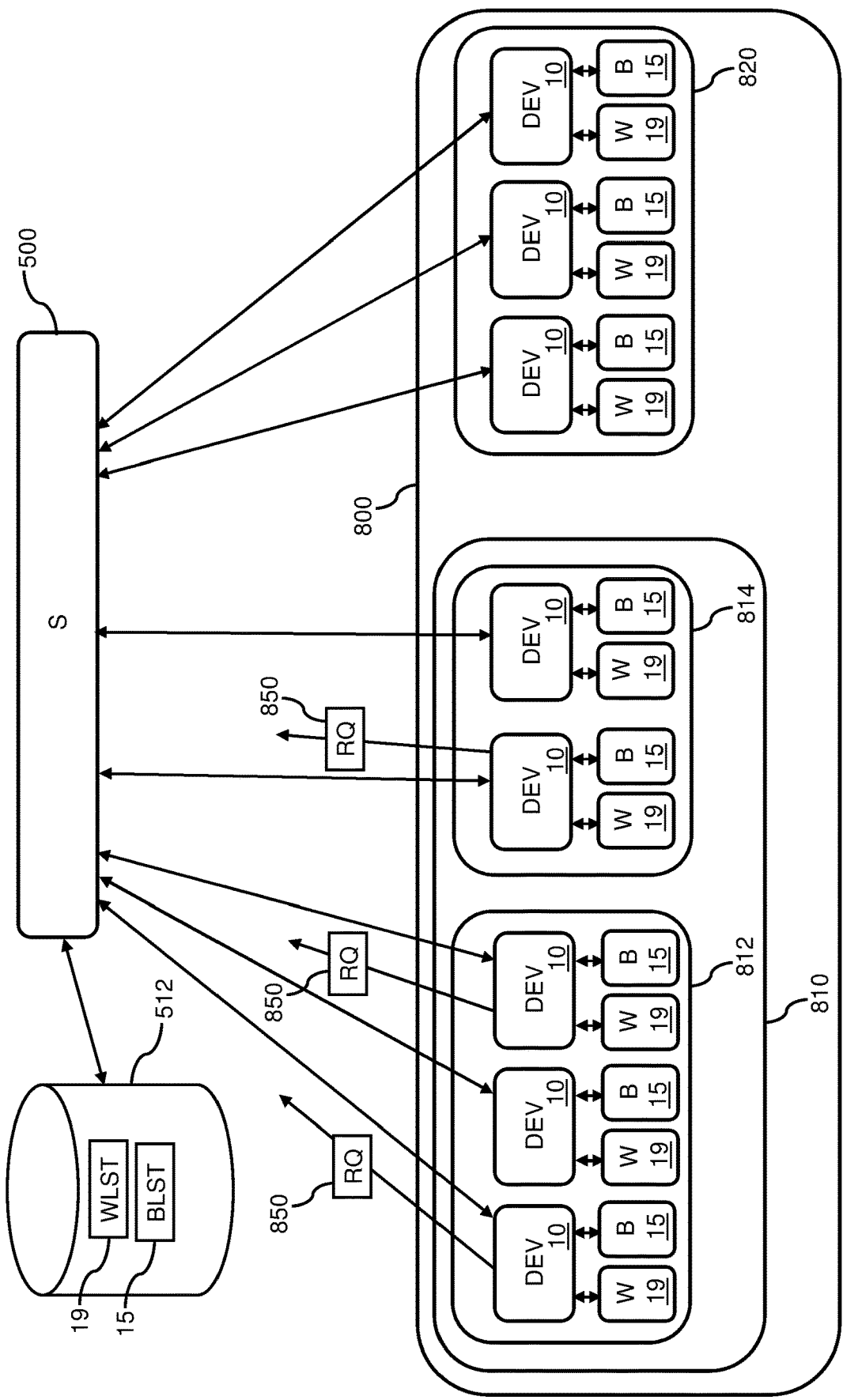
FIG. 18 illustrates a schematic view of the simplified organization in which several users have made requests to the central authority for accessing a certain program.

Referring to FIG. 18, a schematic view of the simplified organization 800 in which several users have made requests 850 to the central authority is shown. In this example, each request 850 is for a target activity that includes accessing the same program. As users of the devices 10 within the organization 800 try to run this program, the users receive messages that the program is blocked (e.g., the program is on a blacklist 15 or missing from any whitelist 19). In some embodiments, a transaction of the attempted target activity is also forwarded to the server computer 500. As the program (target activity) is important to such users, each user sends a request 850 to access that program to the information technology team, for example, through a user interface that runs on the device 10, by sending an email or a phone call or a phone call to the information technology team, a phone call, or sending a written request to the information technology team. Upon reception of the request 850, the request is assigned or queue for response and eventually processed by an information technology team member. In the past, each request was processed independently and there was no correlation to other requests 850.

Figure 19:
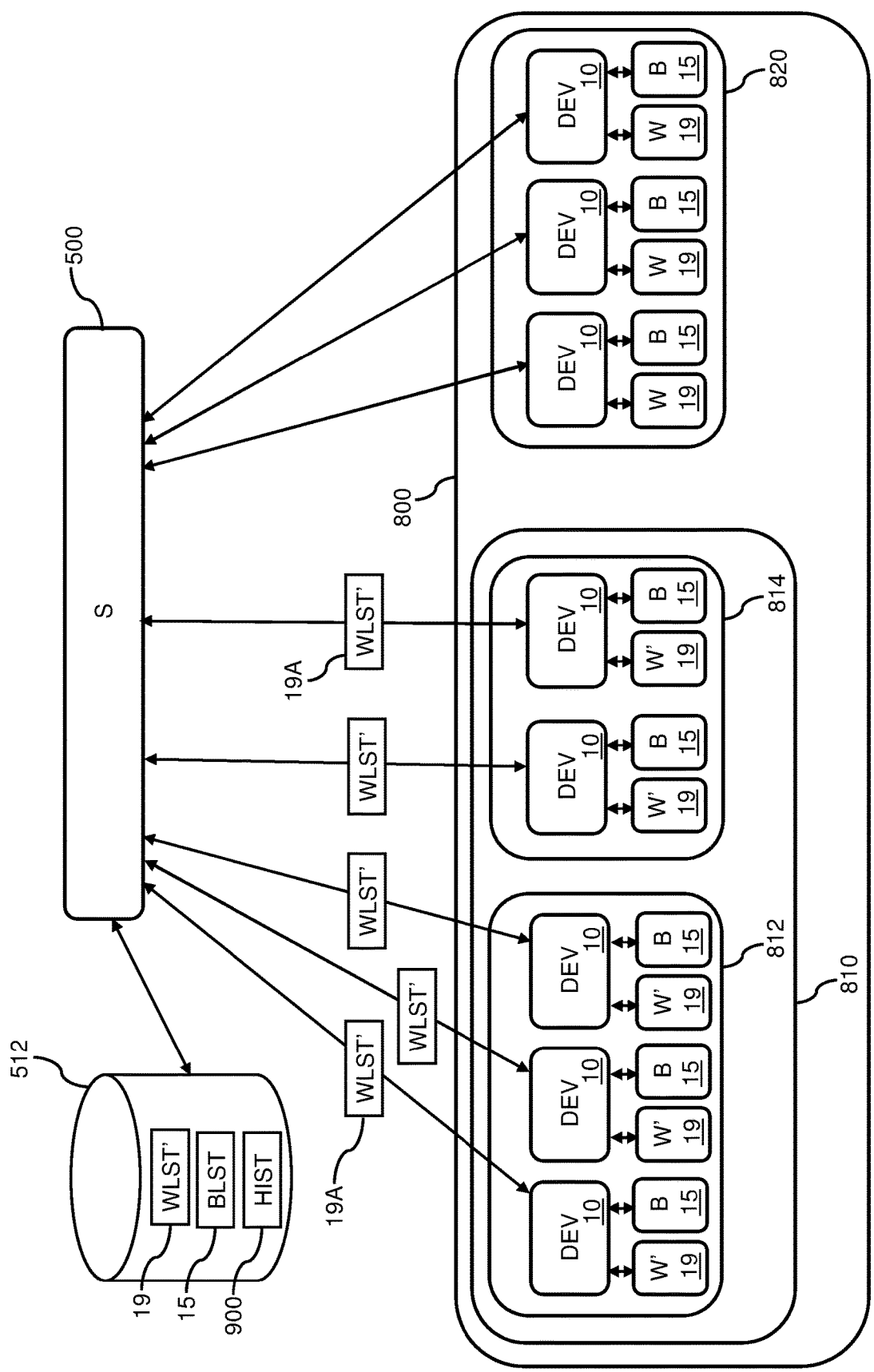
FIG. 19 illustrates a schematic view of the simplified organization in which several users have made requests to the central authority and access to the program is made globally across a portion of the organization.

Referring to FIG. 19, a schematic view of the simplified organization is again shown after several users have made requests to the information technology team. In this example, several users have tried to access the program and smart whitelisting/blacklisting software (e.g., running on the server computer 500) has correlated the multiple requests by way of history 900 and rules 910. The smart whitelisting/blacklisting software provides tools to the information technology team that shows the correlation to prior request 850 and suggestions as to possible administrations that will satisfy the pending request 850 and, possibly, reduce future requests 850. The history 900 provides the smart whitelisting/blacklisting software with information regarding prior requests 850 and/or prior attempts to run the program (e.g., from notification transaction received each time an attempt was made to run that program). The rules 910 provide the smart whitelisting/blacklisting software with various thresholds and correlations to present options to the information technology team member who is processing the current request 850. For example, one rule states that if the same program is requested by three other users within the same organization (or sub-organization) within a certain timeframe, suggest enabling the program across the organization (or sub-organization). Another example rule is if the same program is requested by three other users within one sub-organization and the program was enabled within that sub-organization and this request is made by a user in a second sub-organization, then the suggestion is to enable the program across the second sub-organization.

In the example of FIG. 19, the smart whitelisting/blacklisting software (e.g., running on the server computer 500) suggested to the information technology team member to allow access of the requested program to a portion or all of the organization, in this example, two sub-organizations 812/814. Using tools presented to the information technology team member by the smart whitelisting/blacklisting software, the program is added to the whitelist 19 and updated whitelists 19A are distributed and installed on each of the user devices 10 in the two sub-organizations 812/814. Note that in this example, the second sub-organization 820 (e.g., the executive office) does not receive the updated whitelist 19A as a different level of caution is used for this organization and reflected in the rules 910. For example, a rule 910 indicates that a new program can only be enabled in the whitelist 19 for the second sub-organization 820 after supervisory review.

Figure 20:
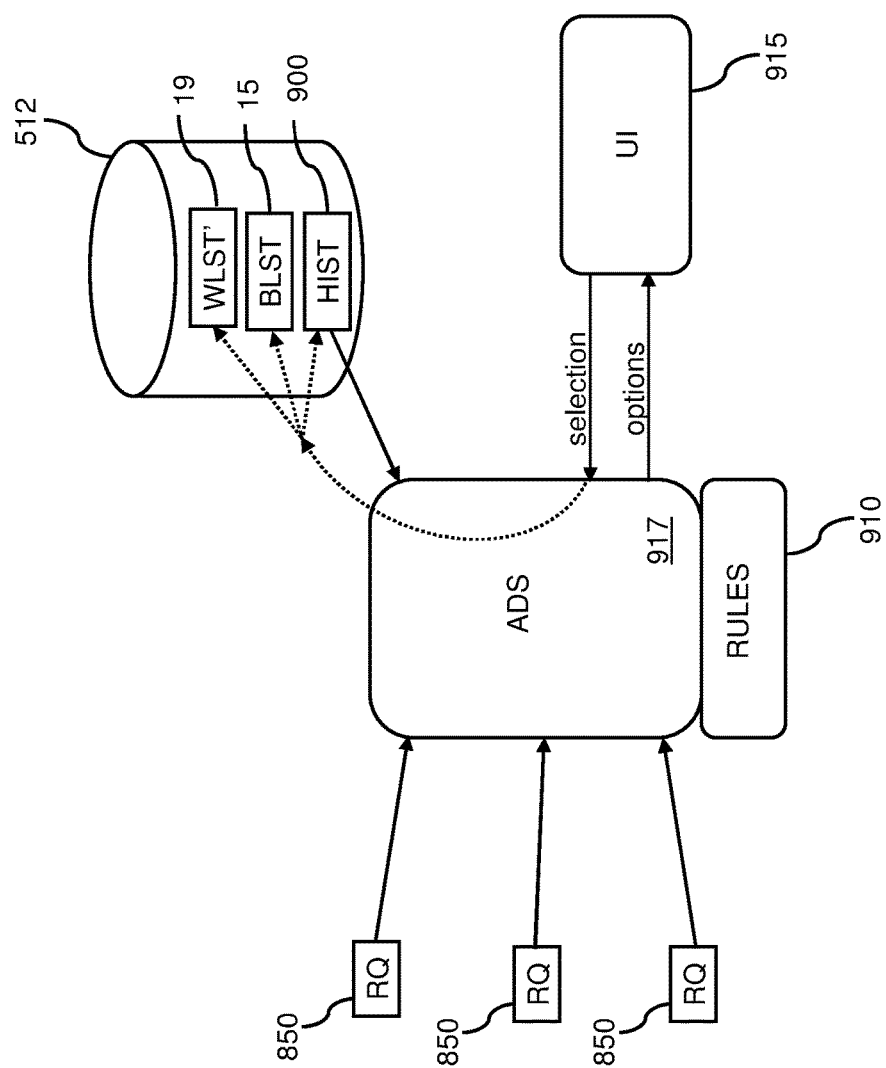
FIG. 20 illustrates a schematic view of software at the central authority receiving requests, utilizing history and rules to present user interfaces that present smart selections for the information technology personnel.

Referring to FIG. 20, a schematic view of the smart whitelisting/blacklisting software as part of the administrative software 917 is shown. The administrative software 917 with smart whitelisting/blacklisting software typically runs at the central authority that receives requests 850, often on a server computer 500 or distributed across one or more computers. The smart whitelisting/blacklisting software utilizes history 900 and rules 910 to present user interfaces that present smart selections for the information technology personnel, for example within a user interface 915.

As requests 850 are received and processed, records of each request 850 are stored in the history 900 (e.g., a history file in data storage 512). The rules 910 are either integrated into the smart whitelisting/blacklisting software as part of the administrative software 917 as programmed heuristics, stored in a separate rules-file (e.g., a rules-file within the data storage 512), or are implemented using artificial intelligence the receives feedback from the user interface 915 indicating what selections were made by the information technology personnel and feedback when a contrary action is performed. For example, if the AI machine recommends enabling a program across an organization and then, a few days later, that program is added to the blacklist because malware is found, the rule that enabled the program is candidate for modification by the AI engine, possibly requiring more time between the first request 850 and suggesting enabling of the program across the entire organization.

For clarity and brevity, distribution of the whitelist 19 and/or blacklist 15 is not shown in FIG. 20.

Figures 21, 22:
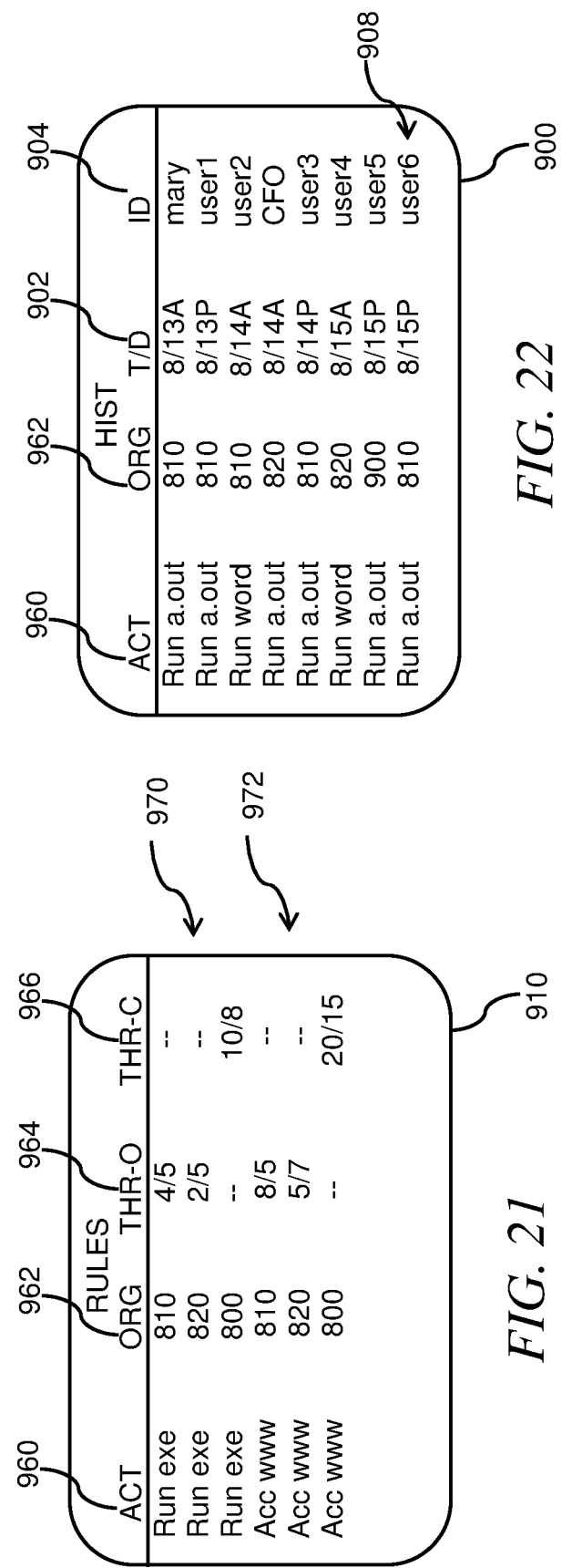
FIG. 21 illustrates a tabular view of an exemplary set of rules.
FIG. 22 illustrates a tabular view of an exemplary history file.

Referring to FIG. 21, a tabular view of an exemplary set of rules 910 is shown. In this example, there are two types of expected activities 960 that are anticipated in a request 850 from users: run an executable 970 or access a web location 972. Note that other types of activities 960 are anticipated such as run a script, etc. For each activity 960, there are rules for various organizations 962, in this example, threshold rules for the organization 964 and threshold rules for the entire company 966. Each threshold rule 964/966 includes a count and a number of days. For example, a threshold rule for the organization 964 of 4/5 indicates that if four requests to enable a certain program are received within a five-day window, then it is recommended to enable that program across the organization 962, in this case the first sub-organization 810. In another example, a threshold rule for the entire company 966 of 10/8 indicates that if ten requests to enable a certain program are received within an eight-day window, then it is recommended to enable that program across the organization 962 (in this case, the company which is the organization 800.

Referring to FIG. 22, a tabular view of an exemplary history file 900 is shown. In this exemplary history file 900, the activity 960 is listed (e.g., a request to enable a user to run "a.out") along with the originating organization 962. Note that in some embodiments, the history file 900 is populated as transactions are received from devices 10, for example, when an attempt is made to run a program that is not currently allowed to be run, while in some embodiments, the history file 900 is populated as requests 850 are received from users of the devices 10, for example, after the user attempts to run a program and receives a message that the program is not currently allowed to be run.

In this exemplary history file, there is a time/date field 902 (shown as date and AM/PM for clarity and simplicity reasons) and an identification 904 field, for example, the user that initiated the request 850 or an identification of the device 10 that attempted to run the program, etc.

In this example, several users have attempted to run the program "a.out" and at the last line 908, the fourth user (user6) has attempted to run the program "a.out" (or the fourth request to enable the program "a.out") has been received within five days, satisfying the first rule in the exemplary rules 910. Therefore, after the fourth user (user6) has attempted to run the program "a.out" (or the fourth request to enable the program "a.out") has been received within five days, the smart whitelisting/blacklisting software (part of the administrative software 917) recommends enabling the program, "a.out." for the organization (the first sub-organization) to the information technology team member. If approved by the information technology team member, a whitelist 19 for that organization (the first sub-organization 810) is modified and distributed to all devices 10 assigned to that organization.

Figure 23:
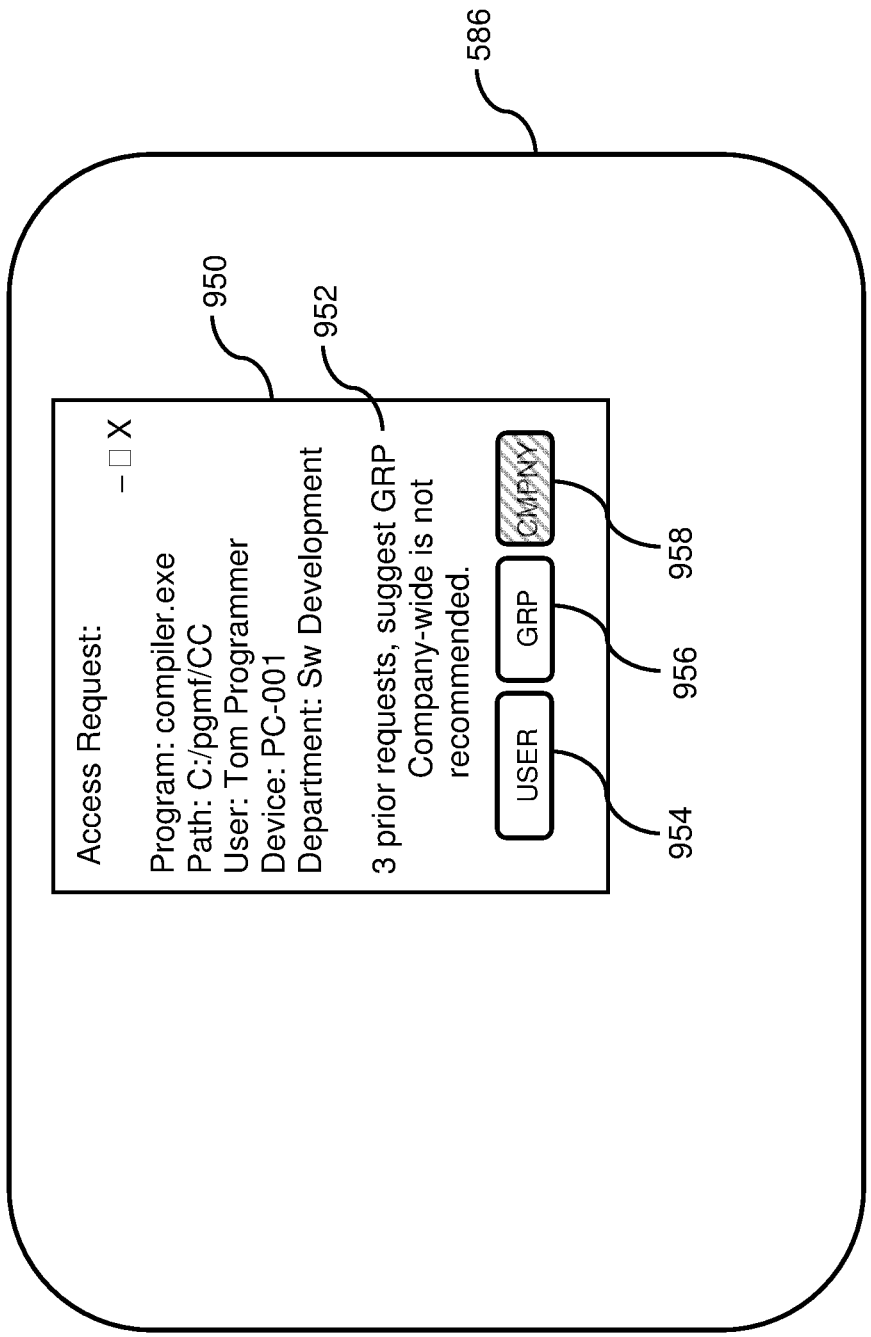
FIGS. 23 and 24 illustrate exemplary administrator user interfaces of the computer security system with smart whitelisting/blacklisting.
Figure 25:
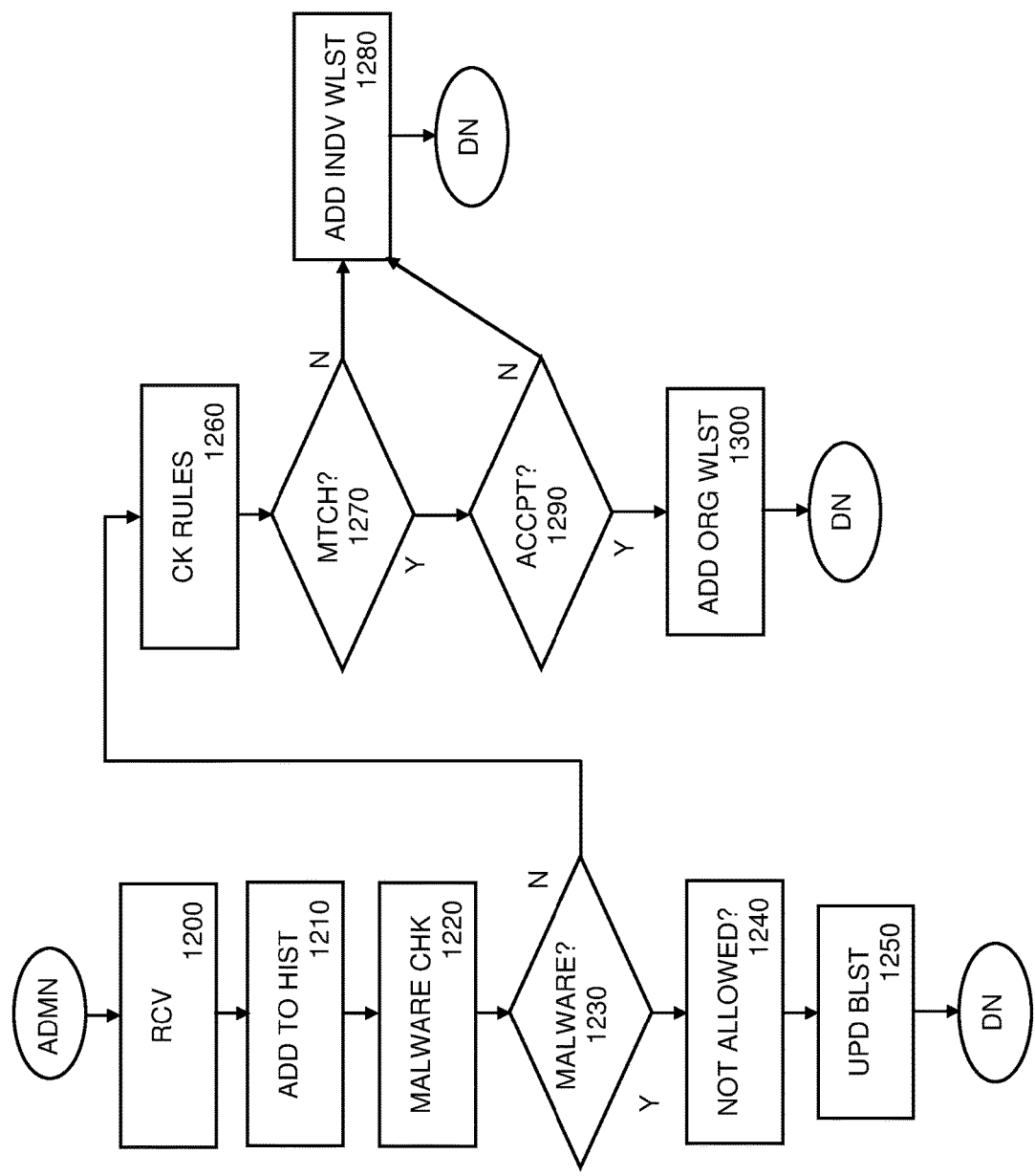
FIG. 25 illustrates a flow chart of software at the central authority for receiving requests and for utilizing history and rules to present user interfaces that present smart selections for the information technology personnel.

Referring to FIGS. 23 and 25, exemplary administrator user interfaces 950/951 of the computer security system with smart whitelisting/blacklisting is shown being displayed on a display 586 of the server computer 500. In such, a user (Tom Programmer) has requested access to a program named "compiler.exe." In this example, the administrator user interface 950 displays the program name, the path in which it is located, the name of the user making the request, the device on which the user desires access to the program, and the department in which the user works (Software development department). The smart whitelisting/blacklisting software running as part of the administrative software 917 on the server computer 500, using the history 900 and rules 910 has determined that three other users have requested access to this program and has made a recommendation 952 to enable this program to run on all devices 12 within the group of the user making the request (e.g., the Software development department). The administrator is still presented with options to enable this program on the user's device 954, within the user's group 956, or company-wide 958. Note that company-wide 958 is highlighted or gray-ed out to make the administrator think twice before enabling the program company-wide 958. Also, as this is an example, it is fully anticipated that for certain organizations, more or less levels of hierarchy are presented to the administrator such as a list of groups, departments, divisions, etc. For example, in a large organization, there are multiple software development teams and several such teams desire use of certain tools/programs.

Figure 24:
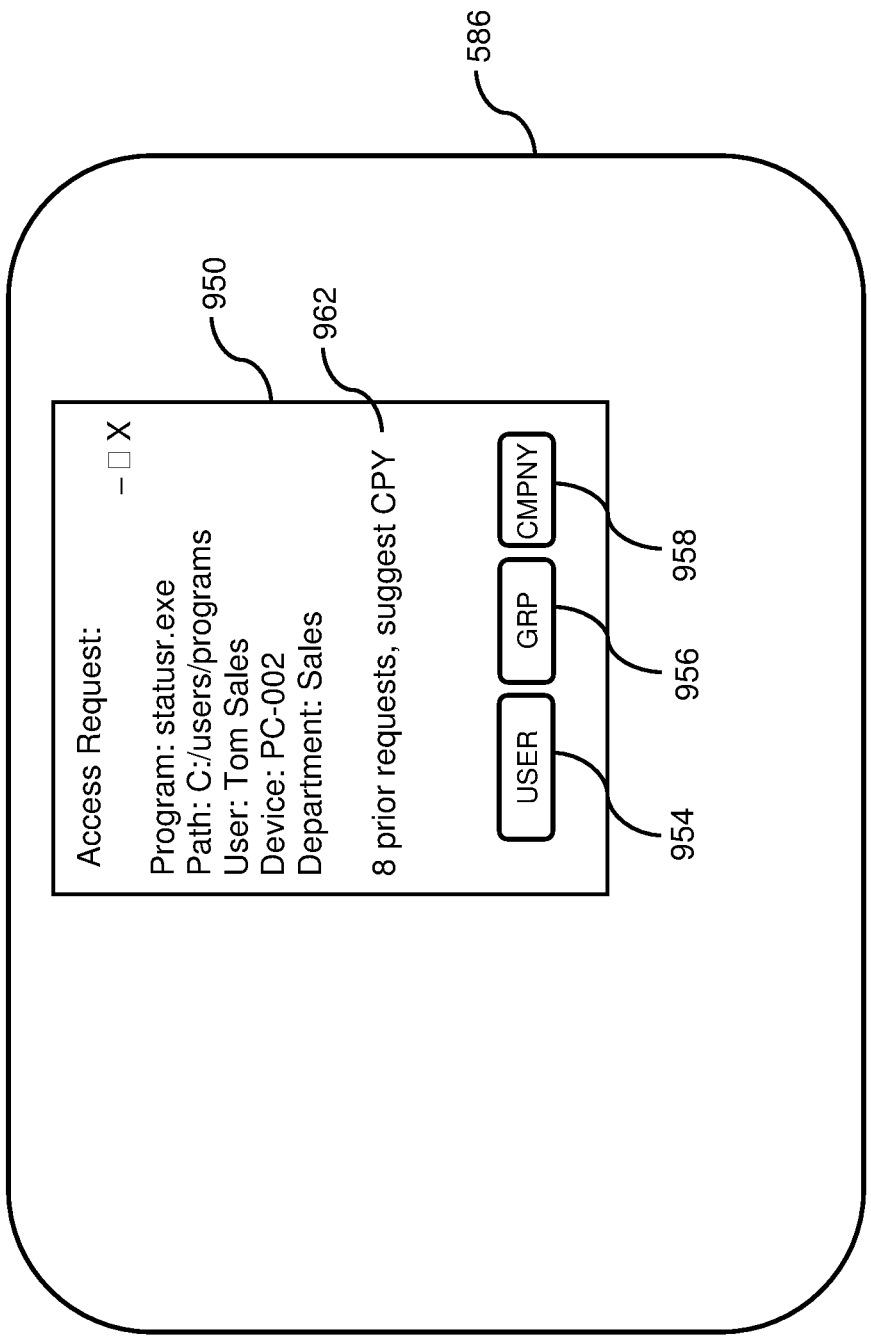

In FIG. 24, a second exemplary administrator user interface 951 of the computer security system with smart whitelisting/blacklisting is shown being displayed on a display 586 of the server computer 500. In such, a user (Tom Sales) has requested access to a program named "status.exe." Again, the second administrator user interface 951 displays the program name, the path in which it is located, the name of the user making the request, the device on which the user desires access to the program, and the department in which the user works (Sales department). The smart whitelisting/blacklisting software running as part of the administrative software 917 on the server computer 500, using the history 900 and rules 910 has determined that eight other users have requested access to this program and has made a recommendation 962 to enable this program to run on all devices 12 within the company of the user making the request (e.g., the Sales department). The administrator is still presented with options to enable this program on the user's device 954, within the user's group 956, or company-wide 958. Note that company-wide 958 is no longer highlighted or gray-ed out as the recommendation is to enable the program company-wide 958.

Referring to FIG. 25, an exemplary flow chart of the smart whitelisting/blacklisting software that is part of the administrative software 917 is shown. In this, the smart whitelisting/blacklisting software for receives 1200 a request (or transaction indicating an unauthorized access was made such as running an unauthorized program) and adds 1210 information from the request 850 to the history 900. Before considering whether to run the target of the request 850 (e.g., a program), in some embodiments a malware check 1220 is performed. If the malware check 1220 determines 1230 that the target of the request is unsafe, the target of the request is not allowed 1240 (e.g., added to the blacklist 15) and the updated list (e.g., blacklist 15) is distributed 1250 to one or more devices 10.

If the malware check 1220 determines 1230 that the target of the request is unsafe, the rules 910 are checked 1260 to see if this request 850 meets any rule thresholds or heuristics. For example, if this is the $4^{th}$ request within five days of the same program from users in the first sub-organization 810 (see FIG. 22). If there is no match found 1270, the target of the request 850 is added 1280 to an individual whitelist 19 (or removed from an individual blacklist 15) such as a whitelist 19 for a single device 10; and the list is distributed only to that device 10.

If there is a match found 1270 and the administrator accepts 1290 the recommended allowance (e.g., enable across an organization or entire company), the target of the request 850 is added 1300 to a whitelist 19 (or removed from an individual blacklist 15) based upon the recommendation and the whitelist 19 (or blacklist 15) based upon the recommendation is forwarded to all devices 10 based upon the recommendation (e.g., forwarded to all devices 10 in an organization or entire company).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for computer security, the system comprising:
a server computer;
an administrative program running on the server computer;
means for requesting a target activity be enabled on a device;
when a request for the target activity is received:
information regarding the request is added to a history file by the administrative program;
the administrative program runs a set of rules for the request using the history file to make a recommendation;
when the recommendation indicates that the target activity be enabled on a single device, a whitelist and/or a blacklist is modified to enable the target activity at the device and the whitelist and/or the blacklist is distributed by the administrative program to the device;
when a positive response is received by the administrative program responsive to the recommendation, the whitelist and/or the blacklist is modified to enable the target activity and the whitelist and/or the blacklist is distributed by the administrative program to a plurality of devices based upon the recommendation; and
when a negative response is received by the administrative program responsive to the recommendation, the whitelist and/or the blacklist is modified to enable the target activity and the whitelist and/or the blacklist is distributed by the administrative program to the device.

2. The system of claim 1, wherein the target activity to run a program.

3. The system of claim 1, wherein the target activity to run a script.

4. The system of claim 1, wherein the target activity to access a unified resource link.

5. The system of claim 1, wherein the means for requesting the target activity be enabled comprises a transaction sent from the device to the server computer after an attempt to perform the target activity on the device.

6. The system of claim 1, wherein the means for requesting the target activity be enabled comprises an email sent from a user of the device to an admirative person having access to the server computer.

7. The system of claim 1, wherein the means for requesting the target activity be enabled comprises a phone call from a user of the device to an admirative person having access to the server computer.

8. The system of claim 1, wherein the recommendation includes an identification of an organization for which the target activity is to be enabled.

9. A method for computer security, the method comprising:
requesting, by a user of a device, that a target activity be enabled on the device and responsive to the requesting by the user:
adding information regarding the target activity to a history file;
making a recommendation using a set of rules and the history file;
when the recommendation indicates that the target activity be enabled on a single device, modifying a whitelist and/or a blacklist to enable the target activity at the device and distributing the whitelist and/or the blacklist to the device;
when receiving a positive response to the recommendation, modifying the whitelist and/or the blacklist to enable the target activity and distributing the whitelist and/or the blacklist to a plurality of devices based upon the recommendation; and
when receiving a negative response to the recommendation, modifying the whitelist and/or the blacklist to enable the target activity and distributing the whitelist and/or the blacklist to the device.

10. The method of claim 9, wherein the target activity to run a program.

11. The method of claim 9, wherein the target activity to run a script.

12. The method of claim 9, wherein the target activity to access a unified resource link.

13. The method of claim 9, wherein the step of requesting by the user of the device that the target activity be enabled on the device comprises the device sending a transaction to a server computer after the user attempting to perform the target activity on the device.

14. The method of claim 9, wherein the step of requesting by the user of the device that the target activity be enabled on the device comprises sending an email from the user of the device to an admirative person.

15. The method of claim 9, wherein the step of requesting by the user of the device that the target activity be enabled on the device comprises making a phone call by the user of the device to an admirative person.

16. The method of claim 9, wherein the recommendation includes an identification of an organization for which the target activity is to be enabled.

17. A method of protecting a device, the method comprising:
upon a program attempting to be run on the device, protection software running on the device determining whether the program is allowed to run based upon a blacklist and a whitelist, the program is allowed to run based upon the program being absent from the blacklist or the program is allowed to run based upon the program being absent from the blacklist and present on the whitelist, thereby allowing the program to run on the device;
otherwise, when the program is present on the blacklist and absent from the whitelist, the protection software preventing the program from running on the device and the protection software sending a transaction to administrative software running on a server, the transaction comprising details of the program;
responsive to receiving the transaction at the server, the administrative software running on the server saving the details of the program in a history file and, the administrative software running on the server analyzing the history file with respect to a set of rules to determine a recommendation for enabling the program, when the recommendation indicates to enable the program on a single device, the administrative software running on the server modifying the whitelist and/or the blacklist to enable the program at the device and the administrative software running on the server distributing the whitelist and/or the blacklist to the device; and otherwise, when the recommendation indicates to enable the program on a plurality of devices within an organization, the administrative software running on the server modifying the whitelist and/or the blacklist to enable the program and the administrative software running on the server distributing the whitelist and/or the blacklist to the plurality of devices.

18. The method of claim 17, wherein the recommendation includes an identification of the organization for which the program is to be enabled.

19. The method of claim 17, wherein after the administrative software running on the server analyzing the history file with respect to the set of rules to determine the recommendation for enabling the program, presenting the recommendation for approval by an administrative person.

20. The method of claim 17, wherein the recommendation includes all devices associated with the organization of a company or all devices associated with an entire company.

* * * * *